US011294491B2

(12) United States Patent
Aoki et al.

(10) Patent No.: US 11,294,491 B2
(45) Date of Patent: Apr. 5, 2022

(54) TOUCH PANEL DISPLAY DEVICE

(71) Applicant: Japan Display Inc., Tokyo (JP)

(72) Inventors: Yoshinori Aoki, Tokyo (JP); Hiroyuki Abe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/132,442

(22) Filed: Dec. 23, 2020

(65) Prior Publication Data

US 2021/0109622 A1    Apr. 15, 2021

Related U.S. Application Data

(63) Continuation of application No. 16/788,785, filed on Feb. 12, 2020, now Pat. No. 10,921,919, which is a
(Continued)

(30) Foreign Application Priority Data

Nov. 13, 2017    (JP) .............................. JP2017-218360

(51) Int. Cl.
*G06F 3/041*    (2006.01)
*G06F 3/044*    (2006.01)
(Continued)

(52) U.S. Cl.
CPC ............ *G06F 3/0412* (2013.01); *G06F 3/044* (2013.01); *G06F 3/04164* (2019.05);
(Continued)

(58) Field of Classification Search
CPC .... G06F 3/041; G06F 3/0412; G06F 3/04164; G06F 3/044; G06F 1/13338;
(Continued)

(56) References Cited

U.S. PATENT DOCUMENTS

2013/0106747 A1*  5/2013  Choi ..................... G06F 3/0443
                                                345/173
2016/0240157 A1*  8/2016  Aoki .................... G09G 3/3666
(Continued)

FOREIGN PATENT DOCUMENTS

CN        10772966 A        10/2017
JP        2017-102454        6/2017
KR        10-2013-0046263 A  5/2013

OTHER PUBLICATIONS

Office Action dated Jan. 20, 2020, in Korean Patent Application No. 10-2018-0137065, Global Dossier Translation only.
(Continued)

*Primary Examiner* — Pegeman Karimi
(74) *Attorney, Agent, or Firm* — Oblon, McClelland, Maier & Neustadt, L.L.P.

(57) ABSTRACT

According to one embodiment, a touch panel display device includes sensor electrodes, an electrode driver, and lines for connection between the electrode driver and the sensor electrodes. The sensor electrodes include first and second electrodes. The lines include first and second lines connected to the first and second electrodes. The second line includes first portions drawn in a direction opposite to terminals of the electrode driver, and a second portion drawn in a direction to the terminals. The first portions are connected to one another via a coupling line.

9 Claims, 16 Drawing Sheets

Related U.S. Application Data continuation of application No. 16/183,951, filed on Nov. 8, 2018, now Pat. No. 10,635,215.

(51) Int. Cl.
  *G09G 3/36* (2006.01)
  *G02F 1/1333* (2006.01)

(52) U.S. Cl.
  CPC ........ *G02F 1/13338* (2013.01); *G06F 3/0416* (2013.01); *G09G 3/3648* (2013.01); *G09G 3/3677* (2013.01); *G09G 3/3688* (2013.01)

(58) Field of Classification Search
  CPC ...... G06F 3/0416; G09G 3/36; G09G 3/3648; G09G 3/3677; G09G 3/3688
  See application file for complete search history.

(56) References Cited

U.S. PATENT DOCUMENTS

| | | | |
|---|---|---|---|
| 2016/0299385 A1* | 10/2016 | Park | G06F 3/0412 |
| 2017/0153746 A1 | 6/2017 | Ahn et al. | |
| 2018/0157171 A1* | 6/2018 | Aridomi | B32B 37/26 |
| 2019/0259345 A1* | 8/2019 | Hosoyachi | G02F 1/13454 |

OTHER PUBLICATIONS

Office Action dated Dec. 10, 2021, in Chinese Patent Application No. 201811344153.2, English Machine Translation, citing document AO.

\* cited by examiner

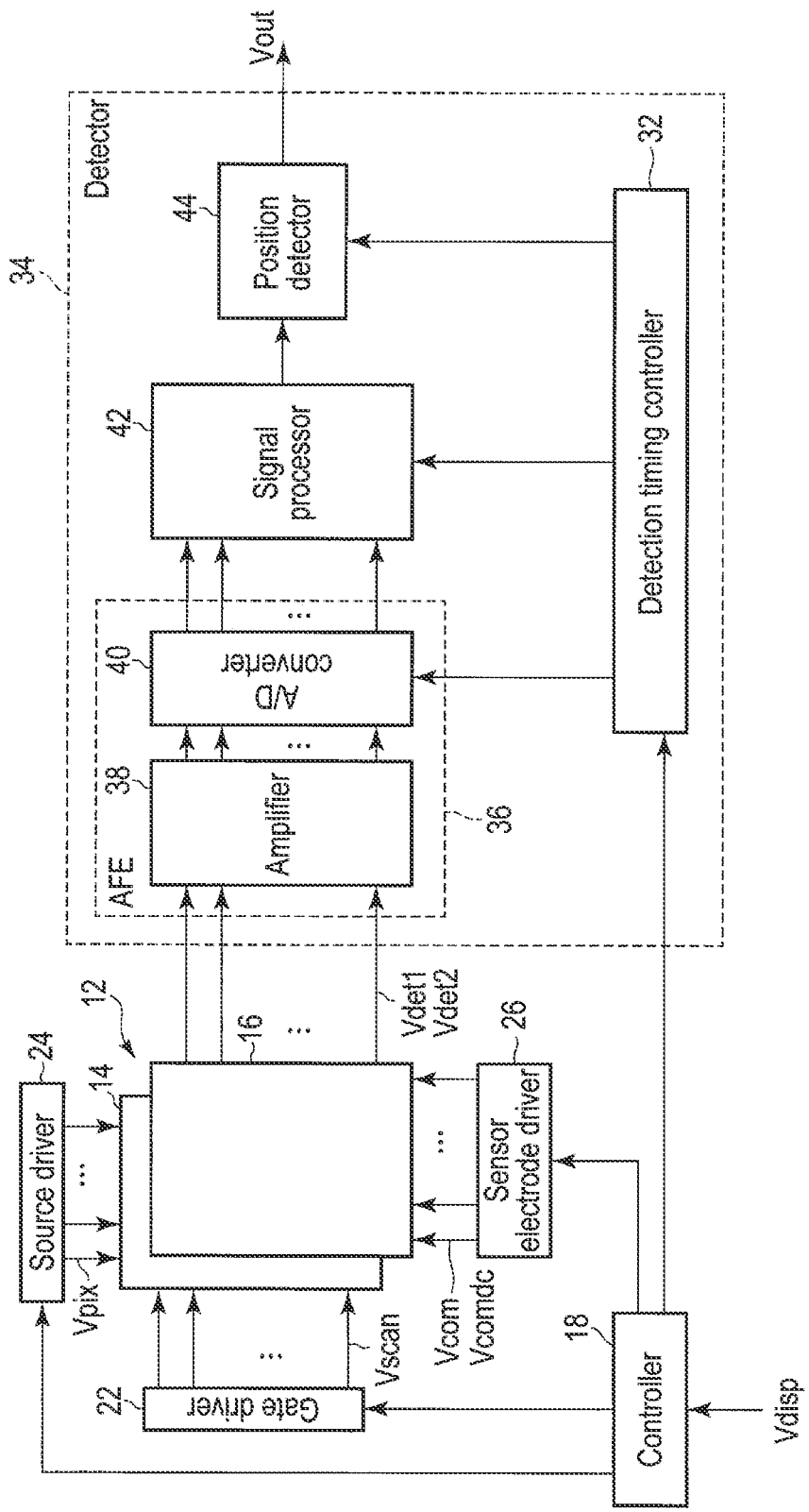
F I G. 1

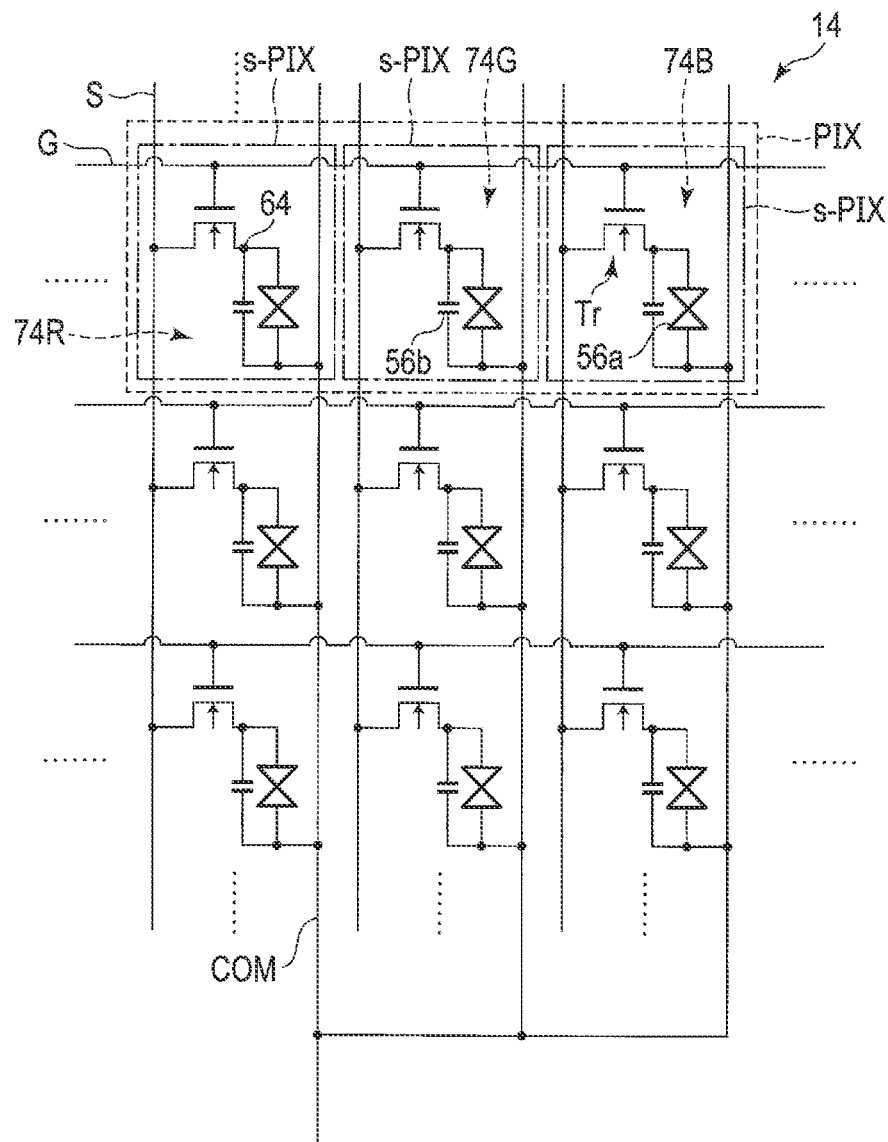
F I G. 3

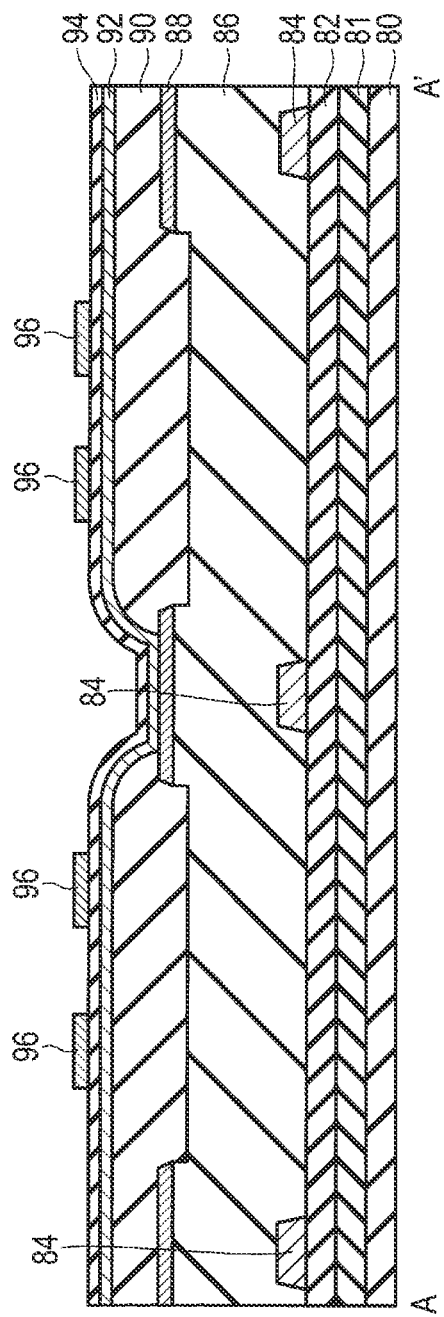
F I G. 16A
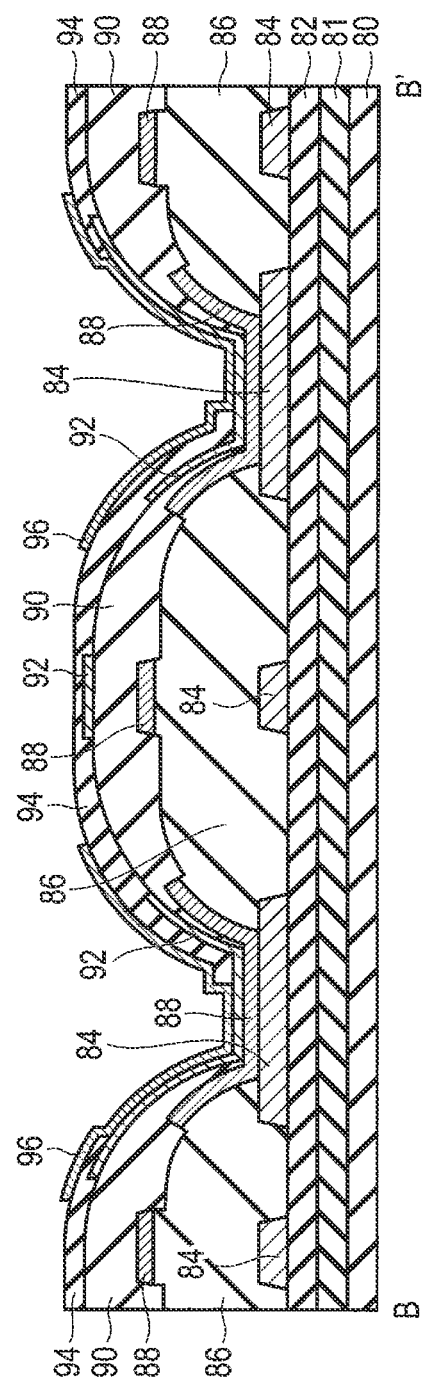
F I G. 16B

TOUCH PANEL DISPLAY DEVICE

CROSS-REFERENCE TO RELATED APPLICATIONS

This application is a continuation of U.S. application Ser. No. 16/788,785 filed Feb. 12, 2020, which is a continuation of U.S. application Ser. No. 16/183,951 filed Nov. 8, 2018, which is based upon and claims the benefit of priority from Japanese Patent Application No, 2017-218360, filed Nov. 13, 2017, the entire contents of each of which are incorporated herein by reference.

FIELD

Embodiments described herein relate generally to a touch panel display device.

BACKGROUND

Mobile terminals such as smartphones, tablet PCs or notebook computers have been prevalent. A number of mobile terminals are equipped with touch panel display devices.

The touch panel display device requires a sensor electrode for touch detection. A line from a driver is connected to the sensor electrode. The line may not be connected to the sensor electrode due to the shape of the sensor electrode.

BRIEF DESCRIPTION OF THE DRAWINGS

FIG. 1 is a block diagram showing an example of an electric configuration of a touch panel display device according to the embodiments.

FIG. 3 is a view showing an example of an equivalent circuit of a pixel.

FIG. 16A is a cross-sectional view seen along line A-A' of FIG. 15.

FIG. 16B is a cross-sectional view seen along line B-B' of FIG. 15.

DETAILED DESCRIPTION

Figure 2:
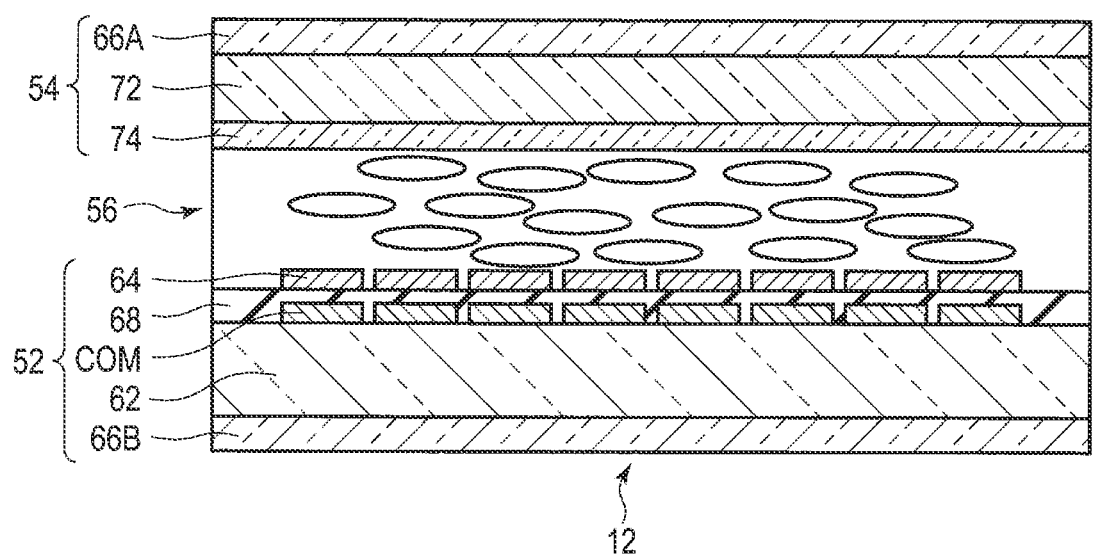
FIG. 2 is a schematic cross-sectional view showing an example of a configuration of a display panel.

Various embodiments will be described hereinafter with reference to the accompanying drawings.

In general, according to one embodiment, a touch panel display device includes sensor electrodes arranged in a matrix in a display area, an electrode driver placed in a peripheral area surrounding the display area, and lines for connection between the electrode driver and the sensor electrodes. The sensor electrodes include a first sensor electrode and a second sensor electrode. The lines include a first line connected to the first sensor electrode and a second line connected to the second sensor electrode. The second line includes first lead portions drawn in a direction opposite to terminals to which the electrode driver is connected, and a second lead portion drawn in a direction to the terminals. The first line includes a second lead portion drawn in the direction to the terminals. The first lead portions are connected to one another via a coupling line.

The disclosure is merely an example and is not limited by contents described in the embodiments described below. Modification which is easily conceivable by a person of ordinary skill in the art comes within the scope of the disclosure as a matter of course. An element may be called a name or plural names. The name or plural names are mere examples. The element may be called another name or other names. In order to make the description clearer, the sizes, shapes and the like of the respective elements may be changed and illustrated schematically in the drawings as compared with those in an accurate representation. Constituent elements corresponding to each other in a plurality of drawings are denoted by similar reference numerals and their detailed descriptions may be omitted unless necessary.

A touch panel display device includes i) an on-cell type in which the display device and the touch panel implementing the touch detection function are produced separately and the touch panel is put on a screen of the display device, and ii) an in-cell type in which the display device and the touch panel are integrated. The on-cell type is also called an external type. The in-cell type is also called a built-in type. The in-cell type display device includes a device in which parts or all of components relating to the touch detection function are used to serve as parts or all of components relating to the display function, and a device in which the components relating to the touch detection function and the components relating to the display function are not used to serve as each other. In the in-cell type display device, for example, a sensor electrode may be formed between a color filter and a polarizer, and a common electrode for display formed on a TFT substrate may be used as a drive electrode for touch detection. Since the in-cell type display device does not include an external touch panel, the display device is entirely slim and lightweight, and visibility of the display is also improved. Embodiments of the in-cell type display device will be explained, but the embodiments can also be supplied to the on-cell type display device.

Examples of the touch detection include various types such as an optical type, a resistive type, a capacitive type, and an electromagnetic induction type. The touch detection of capacitive type utilizes a feature that the electrostatic capacitance between a pair of electrodes, called a drive electrode and a sensor electrode, is varied by approach or contact of an object. The touch detection of capacitive type has benefits that the structure is comparatively simple and that the power consumption is small. A capacitive type touch panel display device will be explained as embodiments.

The touch detection system of capacitive type includes a mutual-capacitive sensing type and a self-capacitive sensing type. The touch detection system of mutual-capacitive sensing type detects an electrostatic capacitance between the drive electrode and the sensor electrode opposed to be spaced apart from each other. The touch detection system of self-capacitive sensing type detects an electrostatic capacitance between the sensor electrode and, for example, a referential potential such as a ground potential. The touch detection display device is an aspect of the input device, and detects an input signal and calculates a touch position when an object such as a finger or a stylus approaches or touches a touch surface. The touch position is coordinates of a point at which the input signal is detected, on the touch surface.

In the present specification, the contact state indicates a state in which the object is in contact with the display surface or a state in which the object approaches the display surface in a distance allowing the object to be considered to contact the display surface. Therefore, the non-contact state indicates a state in which the object is not in contact with the display surface or a state in which the object does not approach the display surface in the distance allowing the object to be considered to contact the display surface. Detection of the contact state of the object is also called touch detection.

A liquid crystal display device, a self-luminous organic EL display device, a plasma display device, an electronic paper-type display device including an electrophoretic element and the like, a display device employing a microelectromechanical system (MEMS), a display device employing electrochromism or the like can be used as the display device. The embodiments using the liquid crystal display device will be explained hereinafter as an example, but the embodiments can also use the organic EL display device, the plasma display device, or the like. The display mode of the liquid crystal display device is largely classified into two modes in accordance with the direction of application of the electric field to vary the alignment of liquid crystal molecules of a liquid crystal layer which is a display function layer. The first mode is called a longitudinal electric field mode in which the electric field is supplied in a thickness direction or an out-of-plane direction. The longitudinal electric field mode includes, for example, twisted nematic (TN) mode, vertical alignment (VA) mode, and the like. The second mode is called a lateral electric field mode in which the electric field is supplied in a plane direction or an in-plane direction. The lateral electric field mode includes, for example, in-plane switching (IPS) mode, fringe field switching (FFS) mode which is a type of the IPS mode, and the like. The technology explained below can be supplied to any one of the longitudinal electric field mode and the lateral electric field. The display device of the lateral electric field will be explained as the embodiments, but the embodiments can also be supplied to the display device of the longitudinal electric field.

The liquid crystal display device with a touch panel can be used for, for example, various devices such as a smartphone, a tablet terminal, a mobile telephone terminal, a notebook computer, a TV receiver, a vehicle-mounted device, and a game console.

First Embodiment

[Schematic Configuration]

FIG. 1 is a block diagram showing an example of an electric configuration of a touch panel display device according to the first embodiment. The display device includes a display panel 12 including a display unit 14 and a touch sensor 16. The display unit 14 and the touch sensor 16 are shown as separate bodies in FIG. 1, but may be integrated. If both of them are integrated, an electrode, a substrate, and the like of the display unit 14 are used to serve as an electrode, a substrate, and the like of the touch sensor 16. In the display unit 14, liquid crystal display elements or organic EL elements may be used as display elements. The display unit 14 includes pixels including the display elements, and includes a display surface opposed to the pixels. A video signal Vdisp is supplied from a host device (not shown) or the like to a controller 18. The controller 18 supplies a control signal to a gate driver 22, a source driver 24, a sensor electrode driver 26, and a detection timing controller 32, based on the video signal Vdisp, and allows the display unit 14 to execute display based on the video signal Vdisp. The controller 18 controls a display operation and a touch detection operation of the display device.

The gate driver 22 sequentially supplies a scanning signal Vscan to a horizontal line or plural horizontal lines serving as target/targets of display drive of the display unit 14, based on the control signal supplied from the controller 18. The horizontal line or plural horizontal lines serving as the target/targets of display drive are sequentially selected. In FIG. 1, the gate driver 22 is provided outside an end (left end) of the horizontal line of the display unit 14, but may be provided outside the other end (right end) or both the right and left ends.

The source driver 24 supplies a pixel signal Vpix to each sub-pixel s-PIX (see FIG. 3) of the display unit 14, based on the control signal supplied from the controller 18. At least part of the functions of the source driver 24 may be built in the display panel 12. In this case, the controller 18 may generates the pixel signal Vpix and supply the pixel signal Vpix to the source driver 24. In addition, parts of the functions of the source driver 24 may be built in the controller 18.

The sensor electrode driver 26 supplies a drive signal Vcomdc which is a constant voltage signal for display to sensor electrodes COMs (see FIG. 4) of the display panel 12, in the display based on the control signal supplied from the controller 18, and supplies a drive signal Vcom which is a high frequency pulse signal for detection to the sensor electrodes COMs (see FIG. 5), in the touch detection. Parts of the functions of the sensor electrode driver 26 may be built in the controller 18. The controller 18 executes a display operation of executing the display by the display unit 14 and a touch detection operation of detecting the contact state of the object by the touch sensor 16, in time division.

The touch sensor 16 can execute the touch detection under the basic principle of the touch detection of the known self-capacitive sensing. The touch sensor 16 outputs a detection signal Vdet2 of the known self-capacitive sensing to a detector 34. In addition, the touch sensor 16 can execute the touch detection under the basic principle of the touch detection of the mutual-capacitive sensing. The touch sensor 16 outputs a detection signal Vdet1 of the mutual-capacitive sensing to the detector 34. The touch sensor 16 may employ any one of the self-capacitive sensing scheme and the mutual-capacitive sensing scheme or may change the schemes and employ the schemes periodically.

The detector 34 detects the contact state of the object on the display surface of the display panel 12, based on the control signal supplied from the controller 18 and the detection signal Vdet1 output from the touch sensor 16 which executes the mutual-capacitive touch detection. The detector 34 detects the contact state of the object on the display surface of the display panel 12, based on the control signal supplied from the controller 18 and the detection signal Vdet2 output from the touch sensor 16 which executes the self-capacitive touch detection. The detector 34 may detect the contact state of the object based on either of the detection signal Vdet1 or Vdet2 or may detect the contact state of the object based on both the detection signals Vdet1 and Vdet2. If the detector 34 detects the contact state, the detector 34 obtains coordinates of the contact position of the object on the display surface, and the like.

The principle of touch detection will be explained briefly. The mutual-capacitive sensor is formed of the drive electrode and the sensor electrode opposed to each other with a dielectric sandwiched therebetween. When the drive pulse Vcom is supplied to the drive electrode, an electric field occurs between the drive electrode and the sensor electrode to generate a signal corresponding to the electric field. Since the electric field occurs between the sensor electrode and the object when the object is in the contact state, the electric field between the electrodes is reduced and amplitude of the generated signal is reduced. This operation is repeated during the drive pulse, and the contact state of the object is detected based on the amplitude of the generated signal.

The self-capacitive sensor includes the sensor electrode. A parasitic capacitance occurs at the sensor electrode at the noncontact time. When the object is in the contact state, the electrostatic capacitance occurs between the sensor electrode and the object, and the capacitance of the sensor electrode is increased. When the drive pulse Vcom is supplied to the sensor electrode, the sensor electrode repeats charging and discharging. The charging and discharging properties are made different in the contact state and the non-contact state due to the difference in electrostatic capacitance of the sensor electrode. This operation is repeated during the drive pulse, and the contact state of the object is detected based on the charging and discharging properties.

The detector 34 includes an analog front end unit (hereinafter referred to as AFE) 36, a signal processor 42, a position detector 44, and the detection timing controller 32. The AFE 36 includes an amplifier 38 and an analog-to-digital converter 40 (A/D converter). The AFE 36 is an analog signal processing circuit which converts the detection signals Vdet1 and Vdet2 into digital signals and outputs the digital signals to the signal processor 42. The detection timing controller 32 controls the A/D converter 40, the signal processor 42, and the position detector 44 to operate synchronously, based on the control signal supplied from the controller 18.

In the touch detection, the amplifier 38 amplifies the detection signal Vdet1 supplied from the touch sensor 16. The A/D converter 40 samples the analog signals output from the amplifier 38 in timing synchronous with the drive signal Vcom and converts the analog signals into digital signals.

The signal processor 42 is a logic circuit which detects touch on the display panel 12, based on the output signals of the A/D converter 40. The signal processor 42 compares the detection signals based on the presence/absence of the object such as a finger or a stylus with a predetermined threshold voltage, and determines whether the object is in the non-contact state or the contact state in accordance with the comparison result.

The position detector 44 is a logic circuit which obtains the coordinates of the contact position on the display surface of the display panel 12 when the contact state is detected by the signal processor 42. The position detector 44 outputs the coordinates as an output signal Vout. The position detector 44 may output the output signal Vout to the controller 18. The controller 18 can execute a predetermined display operation or detection operation, based on the output signal Vout.

The amplifier 38, the A/D converter 40, the signal processor 42, the position detector 44, and the detection timing controller 32 of the detector 34 may be built in the display panel 12. The configuration of the detector 34 is not limited to the above structure, but parts or all of functions of the detector 34 may be built in an external control board or processor. For example, the position detector 44 may be built in an external processor different from the display panel 12. In this case, the detector 34 may output the signals processed by the signal processor 42 as the output signal Vout. Alternatively, the AFE 38 may be built in the display panel 12 while the signal processor 42 and the position detector 44 may be built in external processors. In this case, the detector 34 may output the digital signals processed by the A/D converter 40 as the output signal Vout.

FIG. 2 is a schematic cross-sectional view showing an example of a configuration of the display panel 12. The display panel 12 includes a first substrate 52, a second substrate 54, and a liquid crystal layer 56 placed between the first substrate 52 and the second substrate 54. The second substrate 54 is opposed to the first substrate 52 in a direction perpendicular to the surface of the first substrate 52. As explained below, since pixel electrodes 64 are arranged in two-dimensional array (also called matrix) on the first substrate 52, the first substrate 52 is also called a pixel substrate or an array substrate. The second substrate 54 is also called a counter-substrate. The display panel 2 is observed from the second substrate 54 side. Thus the second substrate 54 may be called an upper substrate while the first substrate 52 may be called a lower substrate.

The first substrate 52 includes a transparent first base 62 such as a glass substrate or a resin substrate, the pixel electrodes 64, sensor electrodes COM, and a polarizer 66B. The pixel electrodes 64 and the sensor electrodes COM are formed of a translucent (optically transparent) conductive material, for example, indium tin oxide (ITO). In addition to ITO, for example, an oxide conductive film formed of at least one of oxides of indium (In), tin (Sn) and zinc (Zn) can be used as the translucent conductive material. A circuit such as a gate scanner included in the gate driver 22, a switching element such as a thin film transistor (TFT), and various lines such as scanning lines and signal lines are provided on the first base 62, though their illustration is omitted in FIG. 2.

The pixel electrodes 64 and the sensor electrodes COM are arrayed in a matrix on the first base 62. The pixel electrodes 64 are provided above the sensor electrodes COM via an insulating layer 68. Thus, the pixel electrodes 64 are placed to overlap the sensor electrodes COM in planar view, but the pixel electrodes 64 are provided in a layer different from a layer of the sensor electrodes COM. The pixel electrodes 64 and the sensor electrodes COM may not be provided in one-to-one relationship but the plural pixel electrodes 64 may correspond to one sensor electrode COM. In FIG. 2, the pixel electrodes 64 are provided on the upper side of the sensor electrodes COM, and the manner of providing the electrodes is not limited to this but the sensor electrodes COM may be provided on the upper side of the pixel electrodes 64. That is, the pixel electrodes 64 and the sensor electrodes COM may be spaced apart in the direction perpendicular to the surface of the first base 62 with the insulating layer 68. Either of them may be provided on the upper position.

In the direction (also called Z direction) perpendicular to the surface of the first substrate 52, the direction from the first substrate 52 to the second substrate 54 is called an upward direction while a direction from the second substrate 54 to the first substrate 52 is called a downward direction. That is, the second substrate 54 is provided on the first substrate 52. The planar view means seeing from the upper side in the direction perpendicular to the surface of the first substrate 52. The polarizer 66B is provided on a lower surface opposite to the sensor electrodes COM of the first base 62.

The second substrate 54 includes a second base 72 such as a glass substrate or a resin substrate, a color filter 74 formed on one of the surfaces of the second base 72, and a polarizer 66A formed on the other surface of the second base 72. The color filter 74 is opposed to the liquid crystal layer 56 in the direction perpendicular to the first substrate 52. The color filter 74 may be placed on the first base 62.

The first substrate 52 and the second substrate 54 are opposed and spaced apart from each other, and the liquid crystal layer 56 is provided between the substrates. The liquid crystal layer 56 modulates transmitted light in accordance with the state of the electric field.

Alignment films are placed between the liquid crystal layer 56 and the first substrate 52, and between the liquid crystal layer 56 and the second substrate 54, respectively, though their illustration is omitted in FIG. 2. An illumination unit (backlight) is provided under the first substrate 52. The illumination unit includes, for example, a light source such as LED and emits light from the light source toward the first substrate 52. The light from the light source is passed through the first substrate 52 and modulated in accordance with the state of parts of the liquid crystal layer 56 corresponding to the respective pixels, and the state of light transmitted to the display surface is varied in the pixels. An image is thereby displayed on the display surface.

FIG. 3 shows an example of an equivalent circuit of the pixel of the display unit 14. The display unit 14 includes the sub-pixels s-PIX arrayed in a matrix. Each of the sub-pixels s-PIX includes a switching element Tr and a liquid crystal element 56a. The switching element Tr is formed of a thin film transistor, for example, TFT of n-channel metal oxide semiconductor (MOS). The insulating layer 68 is provided between the pixel electrodes 64 and the sensor electrodes COM, and a storage capacitor 56b is thereby formed.

The pixel electrodes 64 correspond to the sub-pixels s-PIX constituting respective pixels PIX of the display panel 12. The switching element Tr of each sub-pixel s-PIX, a signal line (also called a source line) S or a scanning line (also called a gate line) G, and the like are formed on the first substrate 52. The signal line S and the scanning line G are electrically connected to the switching element Tr. The switching element Tr is placed at an interconnection (electrically insulated) between the signal line S and the scanning line G. The signal line S is a line to supply the pixel signal Vpix from the source driver 24 to each of the pixel electrodes 64.

The gate driver 22 sequentially selects the scanning lines G. The gate driver 22 supplies the scanning signal Vscan to gates of the switching elements Tr of the sub-pixels s-PIX via the selected scanning line G. The sub-pixels s-PIX in one row (one horizontal line) are thereby selected as targets of display drive. The source driver 24 supplies the pixel signal Vpix to the selected sub-pixels s-PIX via the signal lines S. Then, display is executed in each horizontal line in accordance with the supplied pixel signal Vpix, in these sub-pixels s-PIX.

When the display operation is executed, the sensor electrode driver 26 supplies the drive signal Vcomdc for display, which is the constant voltage signal, to the sensor electrodes COM. The drive signal Vcomdc for display is a voltage signal which becomes a common potential for the sub-pixels s-PIX. Each of the sensor electrodes COM thereby functions as a common electrode for the pixel electrodes 64, in the display operation. The signal lines S and the scanning lines G are provided on a plane parallel to the surface of the first base 62.

In the color filter 74, for example, color regions 74R, 74G, and 74B colored in red (R), green (G), and blue (B) are aligned periodically. Each of the sub-pixels s-PIX is associated with one of the color regions 74R, 74G, and 74B. The pixel PIX is formed of three sub-pixels s-PIX corresponding to three color regions 74R, 74G, and 74B. The color filter 64 may include a color region other than three color regions, for example, a white (W) region.

[Connection Line Between Sensor Electrode and Controller CT (Detection Driver R2)]

Figure 4:
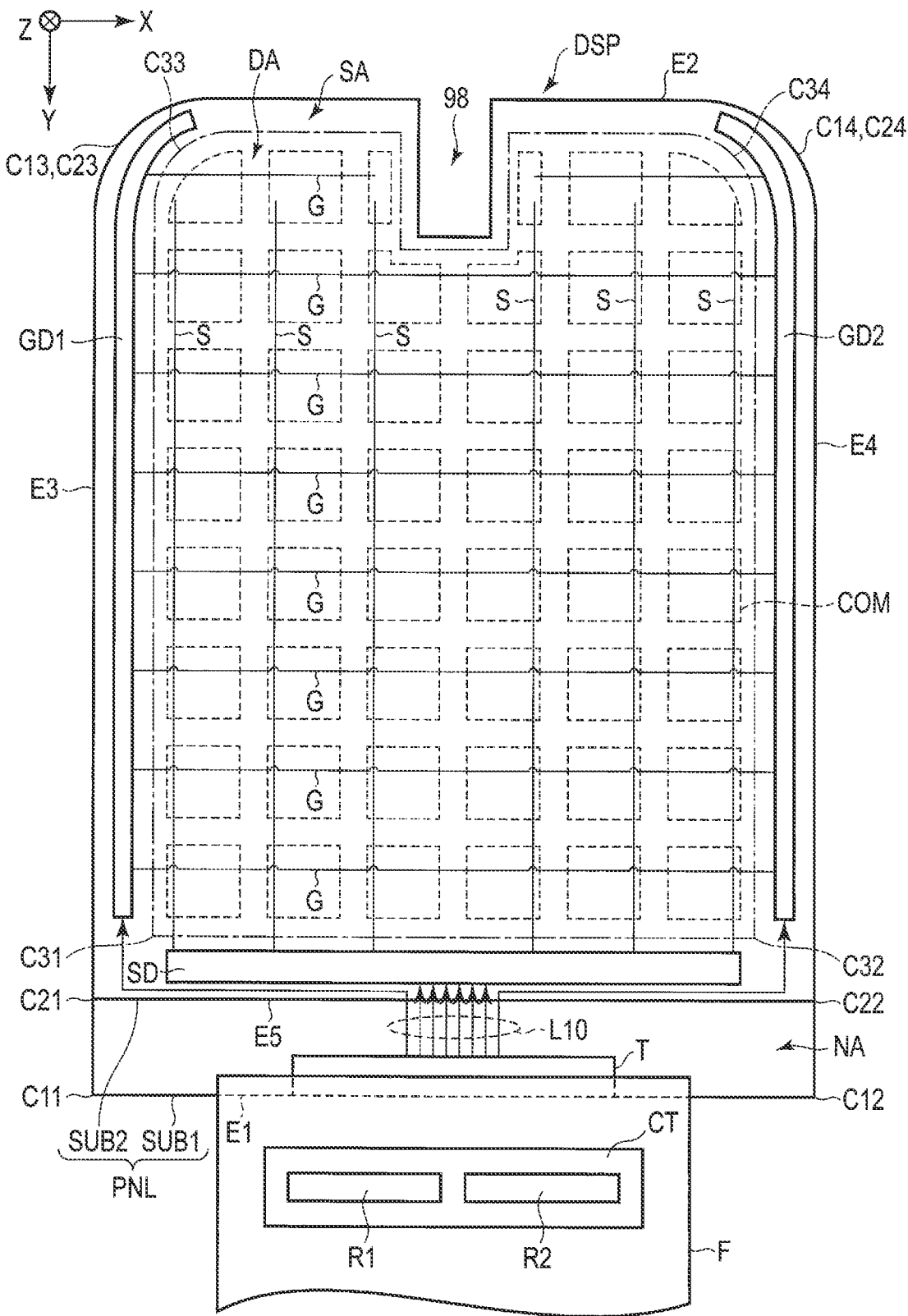
FIG. 4 is a view showing an example of connection between a driver and the display panel for display according a first embodiment.
Figure 5:
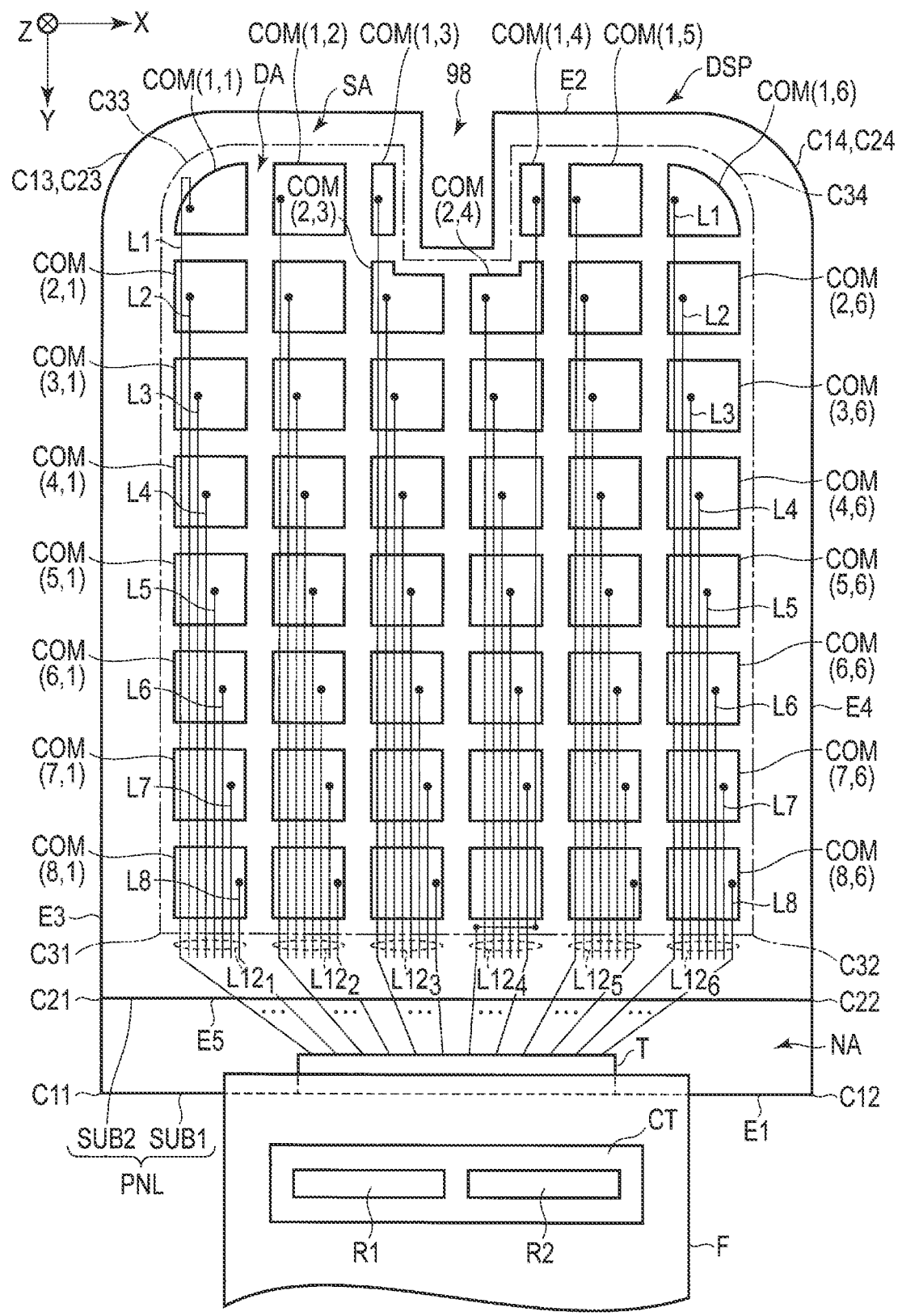
FIG. 5 is a view showing an example of connection between the driver and the display panel for touch detection according the first embodiment.
Figure 6:
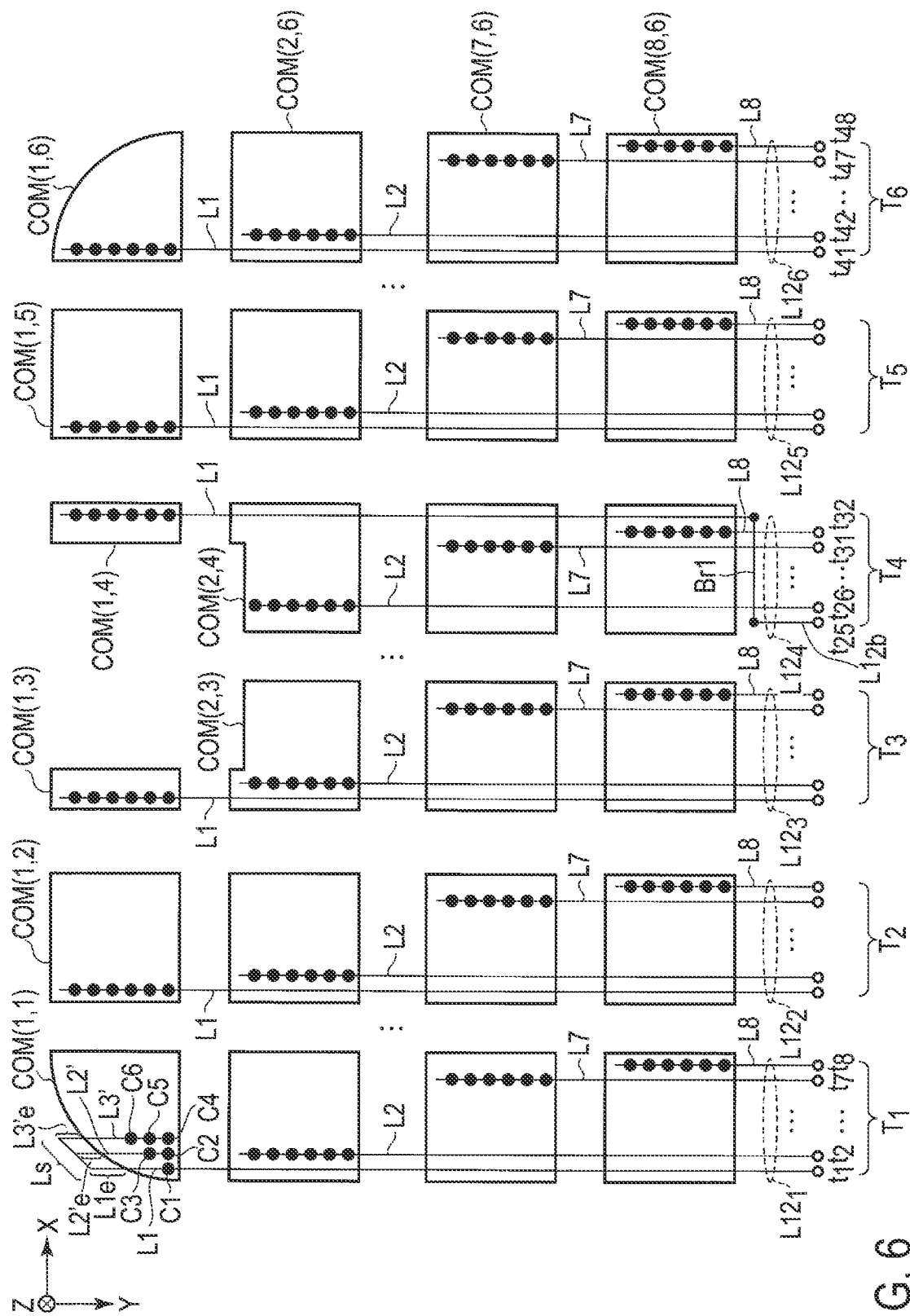
FIG. 6 is a partially enlarged view of FIG. 5.

FIG. 4 shows an example of connection between the pixel electrodes for display and the gate driver and source driver, in the touch panel display device DSP according to the present embodiment. FIG. 5 shows an example of connection between the sensor electrodes COM for touch detection and the sensor electrode driver 26, in the touch panel display device DSP according to the present embodiment. FIG. 6 shows an example of detailed connection between eight lines L1 to L8 of line groups L12$_n$ and the sensor electrodes COM in FIG. 5. The lines (G and S) in FIG. 4 and the lines (L1 to L8) in FIG. 5 are formed in different layers. In the drawings, a first direction (called X direction) and a second direction (called Y direction) which define the surface of the display panel PNL intersect each other, and a third direction (called Z direction) intersects the X direction and the Y direction. For example, the X direction, Y direction, and Z direction are orthogonal to one another but may intersect at an angle other than 90 degrees.

As shown in FIG. 4, the display device DSP includes the display panel PNL (corresponding to the display unit 14 in FIG. 1), a wiring substrate F, and a controller CT. The controller CT formed as IC is mounted on the wiring substrate F. The wiring substrate F is formed of a flexible substrate or the like to connect a host device (not shown) and the display panel PNL.

The display panel PNL includes a first substrate SUB1 (corresponding to the first substrate 52 in FIG. 2) and a second substrate SUB2 (corresponding to the second substrate 54 in FIG. 2). A liquid crystal layer (corresponding to the liquid crystal layer 56 in FIG. 2) is formed between the first substrate SUB1 and the second substrate SUB2, though not depicted in FIG. 4 and FIG. 5. The display panel PNL includes a display area (also called a display surface) DA where an image is displayed and a peripheral area SA other than the display area DA. The display area DA is an area where the pixels PIX or the sub-pixels s-PIX are arranged. The peripheral area SA is an area on an inner side than the outer periphery of the first substrate SUB1 and on an outer side than the display area DA. The peripheral area SA may be a frame shape surrounding the display area DA and, in this case, the peripheral area SA is also called a frame area.

The display panel PNL includes the scanning lines G and the signal lines S in the display area DA. The scanning lines G extend in the X direction and spaced apart in the Y direction. The signal lines S extend in the Y direction and spaced apart in the X direction. The display area DA includes the pixels PIX (see FIG. 3) arrayed in the X direction and the Y direction. The pixels PIX correspond to the sensor electrodes COM. A shape of most of the sensor electrodes COM in planar view is a constant shape, for example a square or rectangle but a shape of several sensor electrodes COM in planar view is an odd shape as explained below. The constant shape is a square in the examples in FIG. 4 and FIG. 5. The squares drawn in broken lines in FIG. 4 and solid lines in FIG. 5, which are arrayed in an array, indicate the sensor electrodes COM.

The display panel PNL includes five edges E1, E2, E3, E4, and E5. The edges E1 and E5 are located on the same side with respect to the display area DA. The edge E2 is located on the side opposite to the edges E1 and E5 with respect to the display area DA. The edge E4 is located on the side opposite to the edge E3 with respect to the display area DA. The edges E1, E2, and E5 extend in the direction X, and the edges E3 and E4 extend in the direction Y. At each of the edges E2, E3, and E4, edges of the first substrate SUB1 and the second substrate SUB2 are aligned. The edge E1 corresponds to the edge of the first substrate SUB1. The edge E5 corresponds to the edge of the second substrate SUB2. The edge E5 is located on a side closer to the display area DA than to the edge E1. The display panel PNL includes a non-opposition area NA (a terminal area) between the edges E1 and E5. The first substrate SUB1 is not opposed to the second substrate SUB2 in the non-opposition area NA. The wiring substrate F is connected to the non-opposition area NA of the first substrate SUB1.

The first substrate SUB1 and the second substrate SUB2 have a substantially rectangular shape in planar view. The first substrate SUB1 includes a corner C11 where the edges E1 and E3 cross, a corner C12 where the edges E1 and E4 cross, a corner C13 where the edges E2 and E3 cross, and a corner C14 where the edges E2 and E4 cross. The second substrate SUB2 includes a corner C21 which is located near the corner C11 and at which the edges E5 and E3 cross, a corner C22 which is located near the corner C12 and at which the edges E5 and E4 cross, a corner C23 which overlaps the corner C13 and at which the edges E2 and E3 cross, a corner C24 which overlaps the corner C14 and at which the edges E2 and E4 cross. The display area DA includes a corner C31 located near and inside the corner C21, a corner C32 located near and inside the corner C22, a corner C33 located near and inside the corners C23 and C13, and a corner C34 located near and inside the corners C24 and C14. A one-dot-chained line in the figure corresponds to the edge of the display area DA, and this edge includes the corners C31, C32, C33, and C34.

Similarly to a general display device, the shape of the first substrate SUB1 and the second substrate SUB2 is a rectangle in planar view, but the shape is not limited to a rectangle but may be the other shape such as a square, the other shape whose corners may be modified arcuately, or the other shape whose corners may partially include recesses or protruding portions. For example, the corners C11 and C12 at both ends of the edge E1 close to the wiring substrate F of the first substrate SUB1, the corners C21 and C22 at both ends of the edge E5 close to the wiring substrate F of the second substrate SUB2, and the corners C31 and C32 at both ends of the edge close to the wiring substrate F of the display area DA are right-angle corners. The corners C13 and C14 at both ends of the edge E2 far from the wiring substrate F of the first substrate SUB1, the corners C23 and C24 at both ends of the edge E2 far from the wiring substrate F of the second substrate SUB2, and the corners C33 and C34 at both ends of the edge far from the wiring substrate F of the display area DA are arcuate and often called round corners. Thus, in the first substrate SUB1 and the second substrate SUB2, two corners at both ends of the lower side are right-angle corners while two corners at both ends of the upper side are arcuately rounded, in planar view, but the shapes of the substrates are approximately rectangular except two round corners of the upper side. The round corners are not indispensable but the shapes of the first substrate SUB1 and the second substrate SUB2 may be rectangular including four right-angle corners.

In addition, a recess may be formed at a part of the edge E2 of the display panel PNL due to an implementation of electronic elements to a circuit board. Though FIG. 4 and FIG. 5 show an example including a recess 98, the recess 98 is not indispensable for the embodiment but the embodiment may imply the display panel not including the recess 98. FIG. 4 and FIG. 5 show an example in which one recess 98 is formed in the center of the edge E2, but the number of the recesses 98 may be plural and the position of formation of the recess 98 is not limited to the center. The recess 98 is formed on the first substrate SUB1 and the second substrate SUB2, but the recess 98 may be formed on the only first substrate SUB1 and the recess 98 may not be formed on the second substrate SUB2.

The recess 98 cuts the first substrate SUB1 and the second substrate SUB2 so as to be curved from the outer peripheries of the first substrate SUB1 and the second substrate SUB2 toward the display area DA. Though the shape of the curved portion is optional and is rectangular in the example of FIG. 4, the shape is not limited to this, but may be a polygon such as a triangle or a pentagon, an arcuate shape, a rectangular shape, or a shape in which tips of a polygon are arcuate.

If at least one of the round corner and recess 98 is present, the shape of the display panel PNL in planar view is called an odd shape. As described below with reference to FIG. 5, the sensor electrodes COM have an odd shape according to the shape of the round corner at the portion where the round corner is provided, and the sensor electrodes COM have an odd shape according to the shape of the recess 98 at the portion where the recess 98 is provided.

As shown in FIG. 4, the display panel PNL includes scanning line drivers GD1 and GD2 (corresponding to the gate driver 22 in FIG. 1) connected to the scanning lines G, a signal line driver SD (corresponding to the source driver 24 in FIG. 1) connected to the signal lines S, in the peripheral area SA. The scanning line driver GD1 is placed between the display area DA and the edge E3, on the first substrate SUB1. The scanning line driver GD2 is placed between the display area DA and the edge E4, on the first substrate SUB1. Either of the scanning line drivers GD1 and GD2 may not be provided. The signal line driver SD is placed between the display area DA and the edge E5, on the first substrate SUB1.

Since the scanning line drivers GD1 and GD2 and the signal line driver SD are placed along the display area DA, the scanning line driver GD1 is provided in an area arcuately curved similarly to the corner C33, in the vicinity to the corner C33, and the scanning line driver GD2 is provided in an area arcuately curved similarly to the corner C34, in the vicinity to the corner C34. The signal line driver SD is provided in a straight area. The scanning line drivers GD1 and GD2 supply the scanning signal Vscan to each of the scanning lines G. The signal line driver SD supplies the video signal Vpix to each of the signal lines S. If the scanning signal Vscan is supplied to the scanning line G corresponding to a certain switching element Tr and the video signal Vpix is supplied to the signal line S connected to this switching element Tr, a voltage corresponding to this video signal Vpix is supplied to the pixel electrodes 64 (though not shown in FIG. 4, a number of the pixel electrodes are provided in the common electrodes COM). In contrast, the drive signal Vcomdc for display is supplied to the sensor electrodes COM. At this time, an alignment state of the liquid crystal molecules contained in the liquid crystal layer 56 is varied in accordance with the magnitude of an electric field generated between the pixel electrodes 64 and the sensor electrodes COM. An image is displayed in the display area DA by this operation.

A connection terminal (a terminal group) T is provided along the edge E1 in the non-opposition area NA. One of ends of the wiring substrate F is connected to the connection terminal T. The other end of the wiring substrate F is connected to the host device (not shown). The controller CT (corresponding to the controller 18 in FIG. 1) mounted on the wiring substrate F includes a display driver R1 (corresponding to the gate driver 22 and the source driver 24 in FIG. 1) for controlling the scanning line drivers GD1 and GD2 and the signal line driver SD, and a detection driver R2 (corresponding to the sensor electrode driver 26 and the detector 34 in FIG. 1) for touch detection. The display driver R1 and the detection driver R2 may be designed as ICs of different packages, separately from the controller CT or may be designed as IC of one package together with the controller CT. A terminal group in the connection terminal T connected to the display driver R1 is connected to the scanning line drivers GD1 and GD2 and the signal line driver SD via a line group L10. The manner of mounting the display driver R1 and the detection driver R2 is not limited to this, but the drivers R1 and R2 may be mounted on, for example, the first substrate SUB1. In addition, the display driver R1 and the detection driver R2 may be mounted on different members.

As shown in FIG. 5, terminal groups in the connection terminal T connected to the detection driver R2 in the connection terminal T are connected to the sensor electrodes COM via line groups $L12_1$ to $L12_6$. The number of terminals constituting the terminal group is equal to the number of sensor electrodes COM. An example of connection between the sensor electrodes COM and the detection driver R2 will be explained with reference to FIG. 5, FIG. 6, FIG. 7A, and FIG. 7B. Sensor electrodes COM(1,1) to COM(8,6) (generically called COM) are arrayed in a matrix on the display area DA of the first substrate SUB1. In other words, the sensor electrodes COM are aligned in the X direction and also aligned in the Y direction. For convenience of explanations, the matrix of the sensor electrodes COM is formed of eight columns and six rows. That is, the sensor electrodes COM in eight rows are arranged in the Y direction, and the sensor electrodes COM in six columns are arranged in the X direction. Each of the sensor electrodes COM corresponding to the sub-pixels s-PIX arrayed in a matrix.

The shape of most of the sensor electrodes COM in planar view is a constant shape or a square in the examples of FIG. 5 and FIG. 6, but the shape of the sensor electrode COM(1,1) corresponding to the round corner C33 of the display area DA is an odd shape obtained by rounding a part (upper left corner) of the square in accordance with the shape of the round corner C33 so as to correspond to the shape of the substrate.

Since the sensor electrode COM corresponds to plural sub-pixels arrayed in a matrix, a part of the square is actually cut away in a step shape in units of sub-pixels. The sensor electrode COM having a corner arcuately rounded for convenience of explanations is shown FIG. 5 and FIG. 6. The shape of the sensor electrode COM(1,6) corresponding to the corner C34 of the display area DA is a shape obtained by arcuately rounding a part (upper right corner) of the square in accordance with the shape of the corner C34. Furthermore, the sensor electrode COM(1,3) and the sensor electrode COM(1,4) on both sides of the recess 98 have a longitudinally elongated rectangular shape narrower in width than the other sensor electrodes COM. The shape of the sensor electrode COM(2,3) on the left of the tip of the recess 98 is a shape obtained by rectangularly cutting a part (upper right) of the square. The shape of the sensor electrode COM(2,4) on the right of the tip of the recess 98 is a shape obtained by rectangularly cutting a part (upper left) of the square. The shapes of the sensor electrodes COM(1,1), COM(1,3), COM(1,4), COM(1,6), COM(2,3), and COM(2, 4) are odd shapes different from a square. The sensor electrodes COM in odd shapes have small area as compared with the other sensor electrodes.

As explained below, a sensor electrode COM having a small area may not secure contact with a sufficient number of lines. If the tip of the recess 98 is rounded, the shape of the sensor electrode COM(2,3) is a shape in which a part (upper right) of the square is arcuately curved inwardly, and the shape of the sensor electrode COM(2,4) is a shape in which a part (upper left) of the square is arcuately curved inwardly.

The detection driver R2 includes terminals connected to the sensor electrodes COM, and supplies the drive voltage Vcom for detection supplied from the sensor electrode driver 26, to the sensor electrodes COM via these terminals and the line groups L12 during the touch detection period. In addition, the detection signals Vdet1 and Vdet2 output from the sensor electrodes COM are input to the detector 34 in the detection driver R2 via the line groups L12 and these terminals, during the touch detection period.

As shown in FIG. 6, the sensor electrodes COM arrayed in a matrix are grouped in each column. In other words, eight sensor electrodes COM(1, n) to COM(8, n) (n=integer of 1 to 6) aligned one-dimensionally in the Y direction constitute one group. The sensor electrodes COM(1, n) to COM(8, n) is connected to the terminals of the detection driver R2 via the line group $L12_n$.

Each of the line groups $L12_n$ includes eight lines L1 to L8 that are connected to eight sensor electrodes COM, respectively. The lines L1 to L8 include main portions placed on the sensor electrodes COM, and lead portions integrated with the main portions and drawn to the peripheral area SA. The main portions may be called L1 to L8. The lead portions include first lead portions led from the sensor electrodes COM(1,1) to COM(1,6) in the first row to the peripheral area SA on the side opposite to the detection driver R2, and second lead portions led from the sensor electrodes COM (8,1) to COM(8,6) in the eighth row to the peripheral area SA on the detection driver R2 side. In each line group $L1^2n$, the line L1 is a line connected to the sensor electrode COM(1, n) farthest from the wiring substrate F, the line L2 is a line connected to the sensor electrode COM(2, n) second farthest from the wiring substrate F, the line L3 is a line connected to the sensor electrode COM(3, n) third farthest from the wiring substrate F and, similarly, the line L8 is a line connected to the sensor electrode COM(8, n) closest to the wiring substrate F. That is, the line L1 is longest, then the lines L2, L3, . . . L7 are longer in this order, and the line L8 is shortest.

The terminal group connected to the detection driver R2 in the connection terminal T includes terminals $t_1$ to $t_{48}$ whose number is equal to the number of the sensor electrodes COM, which correspond to the sensor electrodes COM. The terminal $t_1$ is located on the leftmost side of the terminal group, the terminal $t_{48}$ is located on the rightmost side, and the terminals $t_2$ to $t_{47}$ are located from the left to the right in this order, between the terminal $t_1$ and the terminal $t_{48}$. The terminals $t_1$ to $t_{48}$ are grouped to correspond to the sensor electrodes COM in each column. For example, terminal group $T_1$ formed of the terminals $t_1$ to $t_8$ corresponds to the sensor electrodes COM(1,1) to COM(8,1), terminal group $T_2$ formed of the terminals $t_9$ to $t_{16}$ corresponds to the sensor electrodes COM(1,2) to COM(8,2) and, similarly, terminal group $T_6$ formed of the terminals $t_{41}$ to $t_{48}$ corresponds to the sensor electrodes COM(1,6) to COM(8,6).

Eight terminals $t_{8(n-1)+1}$ to $t_{8(n-1)+8}$ in each terminal group $T_n$ correspond to the sensor electrodes COM(1, n) to COM (8, n) of the sensor electrode group. This correspondence (also called mapping) is determined by the detection driver R2. In accordance with this correspondence, connection between eight terminals $t_{8(n-1)+1}$ to $t_{8(n-1)+8}$ in each terminal group $T_n$ and the lines L1 to L8 connected to the sensor electrodes COM(1, n) to COM(8, n) in the sensor electrode group is determined.

Several examples of mapping will be explained.

In the first mapping example, the leftmost terminal $t_{8(n-1)+1}$ of the eight terminals $t_{8(n-1)+1}$ to $t_{8(n-1)+8}$ in each terminal group $T_n$ corresponds to the sensor electrode COM(1, n) farthest from the wiring substrate F;

the second terminal $t_{8(n-1)+2}$ from the left corresponds to the sensor electrode COM(2, n) second farthest from the wiring substrate F;

the third terminal $t_{8(n-1)+3}$ from the left corresponds to the sensor electrode COM(3, n) third farthest from the wiring substrate F;

the fourth terminal $t_{8(n-1)+4}$ from the left corresponds to the sensor electrode COM(4, n) fourth farthest from the wiring substrate F;

the fifth terminal $t_{8(n-1)+5}$ from the left corresponds to the sensor electrode COM(5, n) fifth farthest from the wiring substrate F;

the sixth terminal $t_{8(n-1)+6}$ from the left corresponds to the sensor electrode COM(6, n) sixth farthest from the wiring substrate F;

the seventh terminal $t_{8(n-1)+7}$ from the left corresponds to the sensor electrode COM(7, n) seventh farthest from the wiring substrate F; and the eighth terminal from the left (rightmost terminal) $t_{8(n-1)+8}$ corresponds to the sensor electrode COM(8, n) eighth farthest from (closest to) the wiring substrate F.

In the second mapping example defining correspondence opposite to the first mapping example, the leftmost terminal $t_{8(n-1)+1}$ of the eight terminals $t_{8(n-1)+1}$ to $t_{8(n-1)+8}$ in each terminal group $T_n$ corresponds to the sensor electrode COM(8, n) closest to the wiring substrate F;

the second terminal $t_{8(n-1)+2}$ from the left corresponds to the sensor electrode COM(7, n) second closest to the wiring substrate F;

the third terminal $t_{8(n-1)+3}$ from the left corresponds to the sensor electrode COM(6, n) third closest to the wiring substrate F;

the fourth terminal $t_{8(n-1)+4}$ from the left corresponds to the sensor electrode COM(5, n) fourth closest to the wiring substrate F;

the fifth terminal $t_{8(n-1)+5}$ from the left corresponds to the sensor electrode COM(4, n) fifth closest to the wiring substrate F;

the sixth terminal $t_{8(n-1)+6}$ from the left corresponds to the sensor electrode COM(3, n) sixth closest to the wiring substrate F;

the seventh terminal $t_{8(n-1)+7}$ from the left corresponds to the sensor electrode COM(2, n) seventh closest to the wiring substrate F; and the eighth terminal from the left (rightmost terminal) $t_{8(n-1)+8}$ corresponds to the sensor electrode COM(1, n) eighth closest to (farthest from) the wiring substrate F.

In two examples explained above, the positions of the sensor electrodes are uniquely changed from the far position to the close position or from the close position to the far position as the positions of the terminals are changed from the left to the right but, in a third mapping example, the positions of the sensor electrodes are alternately changed from the far position to the close position and from the close position to the far position (for example, the second farthest position, the second closest position, the third farthest position, the third closest position, . . . and the like) as the positions of the terminals are changed from the right to the left. The third mapping will be explained in a fifth embodiment with reference to FIG. 13.

In the first embodiment, correspondence between the detection driver R2 and the sensor electrodes is assumed to be first mapping. Therefore, the leftmost terminal $t_{8(n-1)+1}$ of the eight terminals $t_{8(n-1)+1}$ to $t_{8(n-1)+8}$ in each terminal group $T_n$ is connected to the line L1 connected to the sensor electrode COM(1, n) farthest from the wiring substrate F;

the second terminal $t_{8(n-1)+2}$ from the left is connected to the line L2 connected to the sensor electrode COM(2, n) second farthest from the wiring substrate F; similarly, the seventh terminal $t_{8(n-1)+7}$ from the left is connected to the line L7 connected to the sensor electrode COM(7, n) seventh farthest from the wiring substrate F; and the eighth terminal from the left (rightmost terminal) $t_{8(n-1)+8}$ is connected to the line L8 connected to the sensor electrode COM(8, n) eighth farthest from (closest to) the wiring substrate F.

Thus, in the sensor electrodes COM other than the sensor electrodes COM(1,4) to COM(8,4) in the fourth column from the left and corresponding to the recess 98, the line L1 is located at the leftmost position in each line group $L1^2n$ since the line L1 is connected to the terminal $t_{8(n-1)+1}$, and the line L8 is located at the rightmost position in each line group $L1^2n$ since the line L8 is connected to the terminal $t_{8(n-1)+8}$. The line L2 connected to the sensor electrode COM(2, n) second farthest from the wiring substrate F and the terminal $t_{8(n-1)+2}$, the line L3 connected to the sensor electrode COM(3, n) third farthest from the wiring substrate F and the terminal $t_{8(n-1)+3}$, ... and the line L7 connected to the sensor electrode COM(7, n) seventh farthest from the wiring substrate F and the terminal $t_{8(n-1)+7}$ are located in this order from the left between the lines L1 and L8. Each of the lines L1 to L8 is connected to each of the sensor electrodes COM(1, n) to COM(8, n) via a predetermined number of (six in the example shown in FIG. 6) of contacts (black points in the figure).

Figure 7A:
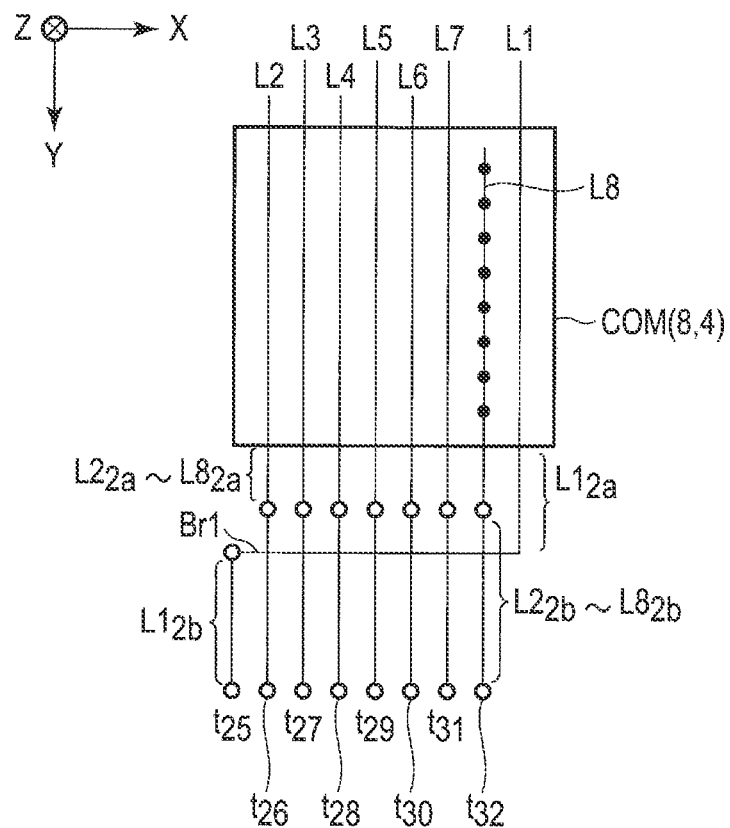
FIG. 7A is an enlarged view showing a sensor electrode COM(8,4) of FIG. 6.
Figure 7B:
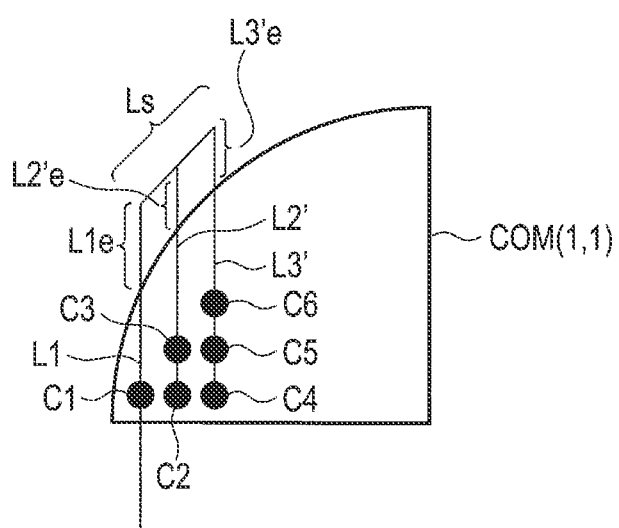
FIG. 7B is an enlarged view showing a sensor electrode COM(1,1) of FIG. 6.

FIG. 7A is an enlarged plan view showing the sensor electrode COM(8,4). FIG. 7B is an enlarged plan view showing the sensor electrode COM(1,1). The second lead portions of the lines L1 to L8 drawn from the sensor electrode COM(8,4) to the peripheral area SA on the detection driver R2 (terminal group) side are connected to the lines of the other layer via contact holes (white circles in FIG. 7A) in the middle of the lead portions and connected to the terminal group T via lines of two layers as shown in FIG. 7A, for the reason explained below. Portions from the sensor electrode COM(8,4) to the contact holes, in the second lead portions, are called the first halves $L1_{2a}$ to $L8_{2a}$ of the second lead portions, and portions from the contact holes to the terminal group T are called the second halves $L1_{2b}$ to $L8_{2b}$ of the second lead portions. In the sensor electrodes COM(1,4) to COM(8,4) in the fourth column from the left, the sensor electrode COM(1,4) farthest from the wiring substrate F is cut away on its left due to influence from the recess 98. Therefore, the line L1 connected to the sensor electrode COM(1,4) is positioned on the rightmost side of the line group $L12_4$.

The rightmost terminal $t_{8(n-1)+8}$ of the eight terminals $t_{8(n-1)+1}$ to $t_{8(n-1)+8}$ constituting each terminal group $T_n$ corresponds to the sensor electrode COM(8, n) closest to the wiring substrate F and the leftmost terminal $t_{8(n-1)+1}$ corresponds to the sensor electrode COM(1, n) farthest from the wiring substrate F. Therefore, an end of the first half $L1_{2a}$ of the second lead portion of the line L1 on the wiring substrate F side is connected to the second half $L1_{2b}$ of the second lead portion of the line L1 extending in the Y direction from a terminal $t_{25}$ of the detection driver R2 (the leftmost terminal of the eight terminals constituting the terminal group $T_4$ corresponding to the sensor electrodes COM(1,4) to COM(8,4)), via a bridge line Br1 extending in the X direction, in the peripheral area SA. Thus, the position of the line L1 can be changed from the rightmost position to the leftmost position in the peripheral area SA on the wiring substrate F side. The leftmost terminal $t_{25}$ of the eight terminals constituting the terminal group T4 corresponding to the sensor electrodes COM(1,4) to COM(8,4) can be connected to the sensor electrode COM(1,4) farthest from the wiring substrate F by the line L1. That is, the arrangement of the lines L1 to L8 in the sensor electrodes COM(1,4) to COM(8,4) is the lines L2 to L8, and L1 in this order from the left, in the display area DA. The lines L2, L3 to L8 are connected to the sensor electrodes COM(2,4), COM(3,4) to COM(8,4), respectively, and the line L1 is connected to the sensor electrode COM(1,4). The positions of six contacts formed in the respective sensor electrodes in the Y direction may be aligned.

Since the bridge line Br1 crosses the second halves $L2_{2b}$ to $L8_{2b}$ of the second lead portions, the bridge line Br1 may be formed in a layer different from the layer where the second halves $L1_{2b}$ to $L8_{2b}$ of the second lead portions. For example, in FIG. 7A, the lines L1 to L8, the first halves $L1_{2a}$ to $L8_{2a}$ of the second lead portions, and the bridge line Br may be formed of the same metal layer and the second halves $L1_{2b}$ to $L8_{2b}$ of the second lead portions may be formed of another metal layer. Further, the first halves $L1_{2a}$ to $L8_{2a}$ of the second lead portions and the second halves $L1_{2b}$ to $L8_{2b}$ of the second lead portions may be formed of the same metal layer and the lines L1 to L8 and the bridge line Br1 may be formed of another metal layer.

The layer structure of the display device will be explained in detail with reference to the second embodiment. The first substrate SUB1 (FIG. 2) is formed of a number of layers as explained below in FIG. 15, FIG. 16A, and FIG. 16B. For example, a semiconductor layer formed of a polysilicon layer is formed on a base, and a scanning line layer (also called a gate line layer) formed of, for example, a molybdenum tungsten alloy (MoW) is formed on the semiconductor layer via an insulating layer formed of an inorganic film. A signal line layer (also called a source line layer) formed of, for example, titanium nitride/titanium/aluminum/titanium (TiN/Ti/AL/Ti) is formed on the scanning line layer via an insulating layer formed of an inorganic film. A metal wiring layer formed of, for example, a titanium nitride/titanium/aluminum/titanium (TiN/Ti/AL/Ti) layer may be formed on the signal line layer via a first insulating layer (first HRC layer) formed of an organic film.

The scanning line layer may be called a first metal layer, the signal line layer may be called a second metal layer, and the metal wiring layer formed of the TiN/Ti/AL/Ti layer on the signal line layer may be called a third metal layer. A first ITO layer is formed on the third metal layer via a second insulating layer (second HRC layer) formed of an organic film. The second HRC layer may be an inorganic film. In the display area DA, the metal wirings of the third metal layer form lines L1 to L8, and the first ITO layer forms the sensor electrodes COM. For example, a second ITO layer is formed on the first ITO layer via an insulating layer formed of silicon nitride (SiNx). The second ITO layer forms the pixel electrodes 64 (FIG. 2). Each of the lines L1 to L8 is connected to the sensor electrodes COM via a contact hole formed in the second HRC layer.

The bridge line Br1 may be formed by a lower layer of the first HRC layer, for example, the second metal layer or the first metal layer or may be formed by the third metal layer. Furthermore, the bridge line Br1 may be formed by the first ITO layer or the second ITO layer of the upper layer of an insulating layer of the second HRC layer.

The number of lines having the arrangement changed with the bridge line Br1 is not limited to one. For example, it is assumed that the depth (the length in the Y direction) of the recess is large and the line connected to the terminal $t_{26}$ of the detection driver R2 to extend in the Y direction cannot make a sufficient number of contacts with the sensor electrode COM(2,4). In this case, the line L2 connected to the sensor electrode COM(2,4) may also be arranged at the second right position, i.e., the left of the line L1, in the line group $L12_4$. The end of the first half $L2_{2a}$ of the second lead portion on the wiring substrate F side of the line L2 may be connected to the second half $L2_{2b}$ of the second lead portion of the line L2 extending in the Y direction from the terminal $t_{26}$ of the detection driver R2, via a second bridge line extending in the X direction in the peripheral area SA.

In the sensor electrodes COM(1,1) to COM(8,1) in the leftmost column, the sensor electrode COM(1,1) farthest from the wiring substrate F is rounded at its upper left corner in accordance with the shape of the round corner C33 of the display area DA. Therefore, the line L1 connected to the terminal $t_1$ (the leftmost terminal in the terminal group $T_1$) of the detection driver R2 to extend in the Y direction may not be able to form a sufficient number of contacts with the sensor electrode COM(1,1). In the example shown in FIG. 6, only one contact C1 can be formed. In accordance with the round shape of the sensor electrode COM(1,1), the sensor electrode COM(1,1) may be able to form no contacts with the line L1 extending in the Y direction. Therefore, the contacts c2 to C6 are formed at positions different from the line L1, in the sensor electrode COM(1,1).

As shown in FIG. 7B, the line L1 connected to the contact C1 includes the first lead portion L1$e$ drawn to the peripheral area SA on the opposite side (the negative side in the Y direction) to the detection driver R2. In the sensor electrodes COM(2,1) to COM(8,1) other than the sensor electrode COM(1,1) corresponding to the round corner C33 of the sensor electrodes COM(1,1) to COM(8,1) in the leftmost column, the lines L2 to L8 are formed up to the sensor electrodes COM(2,1) to COM(8,1). The first lead portions are not drawn from the sensor electrodes COM(2,1) to COM(8,1) from the Lines L2 to L8. The lines L1 to L8 in the sensor electrodes COM in other columns are formed similarly.

A sub-line L2' parallel to the line L1 is formed and connected to the sensor electrode COM(1,1) via the contacts C2 and C3. The sub-line L2' includes a first lead portion L2'$e$ drawn to the peripheral area SA on the opposite side (the negative side in the Y direction) to the detection driver R2. A sub-line L3' parallel to the sub-line L2' is formed and connected to the sensor electrode COM(1,1) via the contacts C4, C5, and C6. The sub-line L3' includes a first lead portion L3'$e$ drawn to the peripheral area SA on the opposite side (the negative side in the Y direction) to the detection driver R2.

Tips of the first lead portions L1$e$, L2'$e$, and L3'$e$ are connected to one another by a coupling line Ls in the peripheral area SA. Thus, the line L1 connected to the terminal $t_1$ (the leftmost terminal in the terminal group $T_1$) of the detection driver R2 is connected to the sensor electrode COM(1,1) via six contacts C1 to C6. The number of contacts is six for convenience of explanations but is not limited to six but may be an arbitrary number. If the number of contacts increases, the number of sub-lines may be increased.

The sub-line L2' may be formed to be noncontact with the line L2 in an extension of the line L2 which is connected to the terminal $t_2$ (the second terminal from the left in the terminal group $T_1$) of the detection driver R2. The sub-line L3' may be formed to be noncontact with the line L3 in an extension of the line L3 which is connected to the terminal $t_3$ (the third terminal from the left in the terminal group $T_1$) of the detection driver R2. Y-directional positions of the contacts C1, C2, and C4 may be aligned. Similarly, Y-directional positions of the contacts C3 and C5 may be aligned. Furthermore, Y-directional positions of the contacts C1 to C6 may be aligned with the contacts of other sensor electrodes COM(1,2) to COM(1,6) of the sensor electrode group in the same row.

The recess 98 is not indispensable and, if the recess 98 is not formed, the line L1 connected to the sensor electrode COM(1,4) farthest from the wiring substrate F may be connected to the leftmost terminal $t_{25}$ in the terminal group $T_4$ via the second lead portion, and may be positioned on the leftmost side. The line L8 connected to the sensor electrode COM(8,4) closest to the wiring substrate F may be connected to the leftmost terminal $t_{32}$ via the second lead portion and may be positioned on the rightmost side. The line L2 connected to the sensor electrode COM(2,4) second farthest from the wiring substrate F and the terminal $t_{26}$, . . . and the line L7 connected to the sensor electrode COM(7, n) seventh farthest from the wiring substrate F and the terminal $t_{31}$ may be located in this order from the left between the line L1 and the line L8.

Since the example of FIG. 6 adopts the first mapping, the sensor electrodes COM(1,1) to COM(8,1) in the leftmost column and the sensor electrodes COM(1,4) to COM(8,4) on the right of the recess 98, i.e., in the fourth column from the left are exceptional sensor electrode groups in which the arrangement of the lines L1 to L8 is different from the arrangement of the lines L1 to L8 of the other sensor electrode COM. The first embodiment may employ second mapping. In this case, the sensor electrodes COM(1,6) to COM(8,6) in the rightmost column and the sensor electrodes COM(1,3) to COM(8,3) on the left of the recess 98, i.e., in the third column from the left are exceptional sensor electrode groups. That is, if the second mapping is adopted, the detection driver R2 and the sensor electrodes COM are connected by the wiring pattern obtained by laterally reversing the wiring pattern of FIG. 6.

In a display device adopting the second mapping and including no recess 98, connection is also made based on the second mapping, in the sensor electrodes COM(1,4) to COM(8,4), similarly to the other sensor electrode COM. In this case, a bridge line Br1 is unnecessary.

If a display device has an odd shape in which the sensor electrodes COM are partially rounded in accordance with the shape of the round corner C33 of the display area DA, sufficient number of contacts cannot be made with the lines extending from the detection driver R2. According to the first embodiment, contacts are made at the portions other than the lines extending from the detection driver R2. Lead portions connected to these contacts are drawn to the peripheral area SA in the direction opposite to the direction to the detection driver R2. The lead portions drawn from these contacts are connected to one another in the peripheral area SA. Thus, contacts between the sensor electrodes COM including the round corners and the detection driver R2 can be secured.

Furthermore, even if the sensor electrode is partially cut away in accordance with the recess 98 in the display area DA so that sufficient contacts with the lines extending from the detection driver R2 cannot be secured, contacts between the sensor electrodes COM and the detection driver R2 can be secured by replacing the arrangement of the lines in the peripheral area SA between the detection driver R2 and the sensor electrodes COM. To replace the arrangement of the lines, the first half $L1_{2a}$ of the second lead portion connected to the sensor electrode COM to extend in the Y direction and the second half $L1_{2b}$ of the second lead portion connected to the detection driver R2 to extend in the Y direction are connected with the bridge line Br1 extending in the X direction which intersects the lines. The sensor electrodes COM and the detection driver R2 can be thereby connected even if the sensor electrodes are partially cut away due to the recess.

Other embodiments will be hereinafter explained but explanations of the same constituent elements as those of the above-explained embodiment will be omitted in the other embodiments.

Second Embodiment

Figure 8:
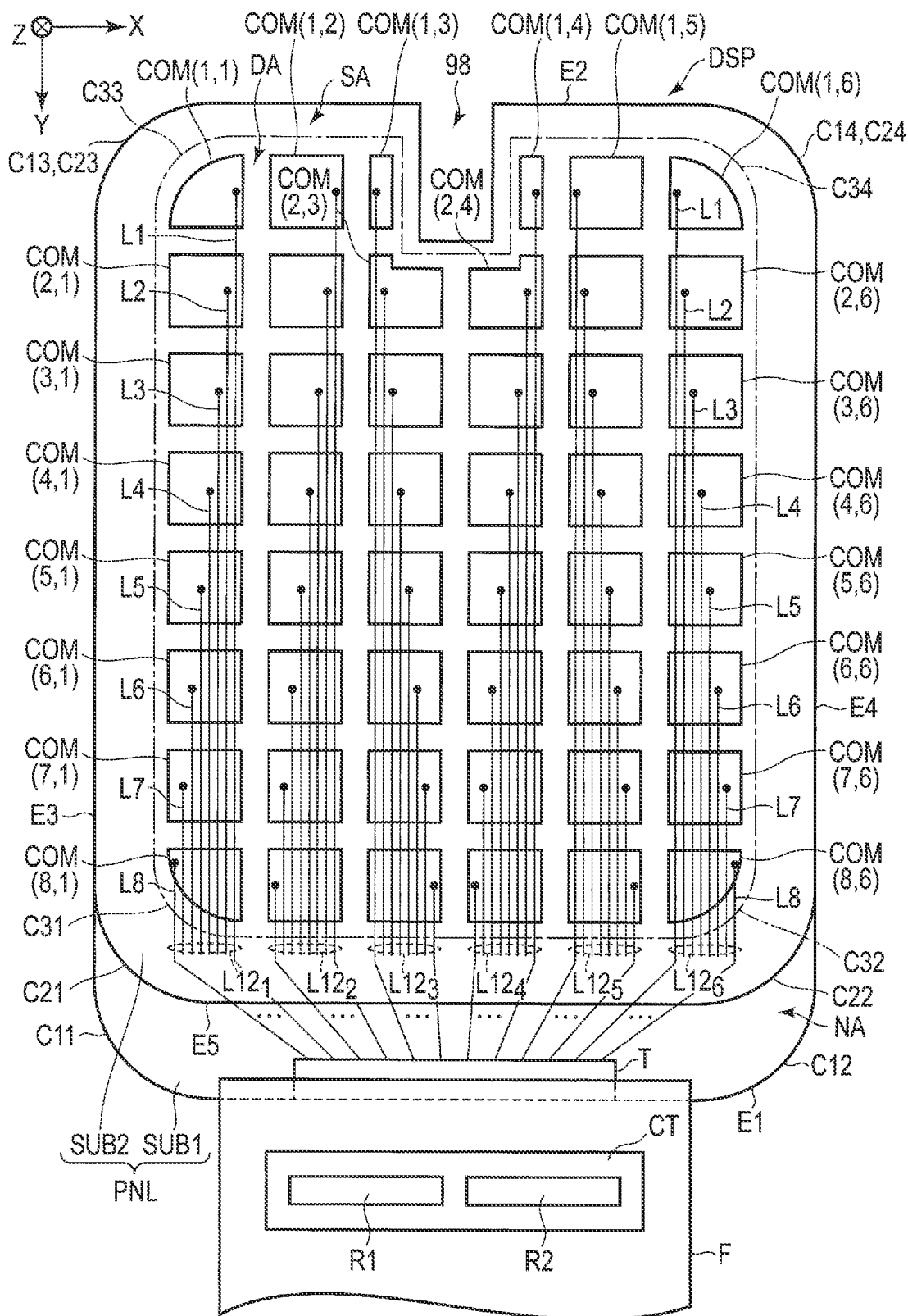
FIG. 8 is a view showing an example of connection between the driver and the display panel for touch detection according a second embodiment.

FIG. 8 shows an example of connection between the sensor electrodes COM for touch detection and the sensor electrode driver 26 (the detection driver R2), in the touch panel display device DSP according to the second embodiment. In the first embodiment, the shape of the display panel PNL in planar view is an approximately rectangular odd shape in which a shape of two corners of an upper side is arcuate while a shape of two corners of a lower side is right-angle. A touch panel display device including display panel PNL having an approximately rectangular odd shape having four corners rounded in an arcuate shape will be explained as the second embodiment. Unlike the first embodiment shown in FIG. 5 and FIG. 6, in the second embodiment, as shown in FIG. 8, the corners C11 and C12 at both ends of the edge E1 close to the wiring substrate F of the first substrate SUB1, the corners C21 and C22 at both ends of the edge E5 close to the wiring substrate F of the second substrate SUB2, and the corners C31 and C31 at both ends of the edge close to the wiring substrate F of the display area DA are arcuate (also called round corners), similarly to two corners of the upper side. An example of including the recess 98 at a central portion of the upper side will be explained with reference to FIG. 8, but the recess 98 is not indispensable similarly to the first embodiment and may not be provided.

Though not illustrated in FIG. 8, the scanning line driver GD1 of the second embodiment is provided in a region curved in an arcuate shape similarly to the corner C31, in the vicinity to the corner C31. Similarly, the scanning line driver GD2 of the second embodiment is provided in a region curved in an arcuate shape similarly to the corner C32, in the vicinity to the corner C32.

The terminal $t_1$ to $t_{48}$ of the detection driver R2 are grouped to correspond to the sensor electrode COM group in each column, similarly to the first embodiment. Mapping between eight terminals $t_{8(n-1)+1}$ to $t_{8(n-1)+8}$ in each terminal group $T_n$ and sensor electrodes COM(1, n) to COM(8, n) of the sensor electrode group is different from that of the first embodiment. The first embodiment entirely adopts the first mapping or the second mapping for all of the sensor electrode groups, but the second embodiment adopts the first mapping or the second mapping for each sensor electrode group and entirely employs the first mapping and the second mapping.

The first mapping is adopted for the sensor electrodes COM(1,3) to COM(8,3) in the third column from the left and the sensor electrodes COM(1,6) to COM(8,6) in the six column from the left (the rightmost column). The second mapping is adapted for the sensor electrodes COM(1,1) to COM(8,1) in the leftmost column and the sensor electrodes COM(1,4) to COM(8,4) in the fourth column from the left. The first mapping or the second mapping may be adopted for the sensor electrodes COM(1,2) to COM(8,2) in the second column from the left and the sensor electrodes COM(1,5) to COM(8,5) in the fifth column from the left, but the second mapping is adopted for the sensor electrodes COM(1,2) to COM(8,2) in the second column from the left and the first mapping is adopted for the sensor electrodes COM(1,5) to COM(8,5) in the fifth column from the left.

Thus, the second mapping is adopted for the sensor electrodes COM(1,1) to COM(8,1) in the leftmost column, the sensor electrodes COM(1,2) to COM(8,2) in the second column from the left, and the sensor electrodes COM(1,4) to COM(8,4) in the fourth column from the left.

Therefore, the leftmost terminal $t_{8(n-1)+1}$ of the eight terminals in each terminal group $T_n$ is connected to the line L8 connected to the sensor electrode COM(8, n) closest to the wiring substrate F;

the second terminal $t_{8(n-1)+2}$ from the left is connected to the line L7 connected to the sensor electrode COM(7, n) second closest to the wiring substrate F; similarly, the seventh terminal $t_{8(n-1)+7}$ from the left is connected to the line L2 connected to the sensor electrode COM(2, n) seventh closest to the wiring substrate F; and the eighth terminal from the left (rightmost terminal) $t_{8(n-1)+8}$ is connected to the line L1 connected to the sensor electrode COM(1, n) eighth closest to (farthest from) the wiring substrate F.

Therefore, in the line group $L1^2 n$ of sensor electrodes COM(1, n) to COM(8, n), the line L1 is located on the rightmost side (edge E4 side) in planar view of FIG. 8, the line L8 is located on the leftmost side (edge E3 side), and the lines L2, L3, . . . L7 are located in this order from the right to the left, between the lines L1 and L8.

The first mapping is adopted for the sensor electrodes COM(1,3) to COM(8,3) in the third column from the left, the sensor electrodes COM(1,5) to COM(8,5) in the fifth column from the left, and the sensor electrodes COM(1,6) to COM(8,6) in the sixth column from the left (the rightmost column).

Therefore, the leftmost terminal $t_{8(n-1)+1}$ of the eight terminals in each terminal group $T_n$ is connected to the line L1 connected to the sensor electrode COM(1, n) farthest from the wiring substrate F;

the second terminal $t_{8(n-1)+2}$ from the left is connected to the line L2 connected to the sensor electrode COM(2, n) second farthest from the wiring substrate F and, similarly, the seventh terminal $t_{8(n-1)+7}$ from the left is connected to the line L7 connected to the sensor electrode COM(7, n) seventh farthest from the wiring substrate F; and the eighth terminal from the left (rightmost terminal) $t_{8(n-1)+8}$ is connected to the line L8 connected to the sensor electrode COM(8, n) eighth farthest from (closest to) the wiring substrate F.

Therefore, in the line group L12n of sensor electrodes COM(1, n) to COM(8, n), the line L1 is located on the leftmost side (edge E3 side) in planar view of FIG. 8, the line L8 is located on the rightmost side (edge E4 side), and the lines L2, L3, . . . L7 are located in this order from the left to the right, between the lines L1 and L8.

If a display device has odd shaped sensor electrodes at laterally symmetrical positions, sufficient number of contacts cannot be secured with the sensor electrodes COM(1,1) and COM(1,6) in which one of corners is rounded in accordance with the shapes of the shapes of the round corners C33 and C34 of the display area DA, and the sensor electrodes COM(1,3), COM(1,4), COM(2,3), and COM(2, 4) in which at least one of corners is cut away in accordance with the shape of the recess 98. According to the second embodiment, by adopting different mapping for the left and right parts in the sensor electrode group, sufficient contact with the line connected to the detection driver R2 can be secured for these sensor electrodes.

Unlike the example shown in FIG. 8, the first mapping is adopted for the sensor electrodes COM(1,2) to COM(8,2) in the second column from the left, and the second mapping is adopted for the sensor electrodes COM(1,5) to COM(8,5) in the fifth column from the left.

If the recess 98 is not formed, the same mapping as that of the second embodiment is adopted for the leftmost or rightmost sensor electrode group, but either the first mapping or the second mapping may be adopted for the other sensor electrode groups.

Third Embodiment

Figure 9:
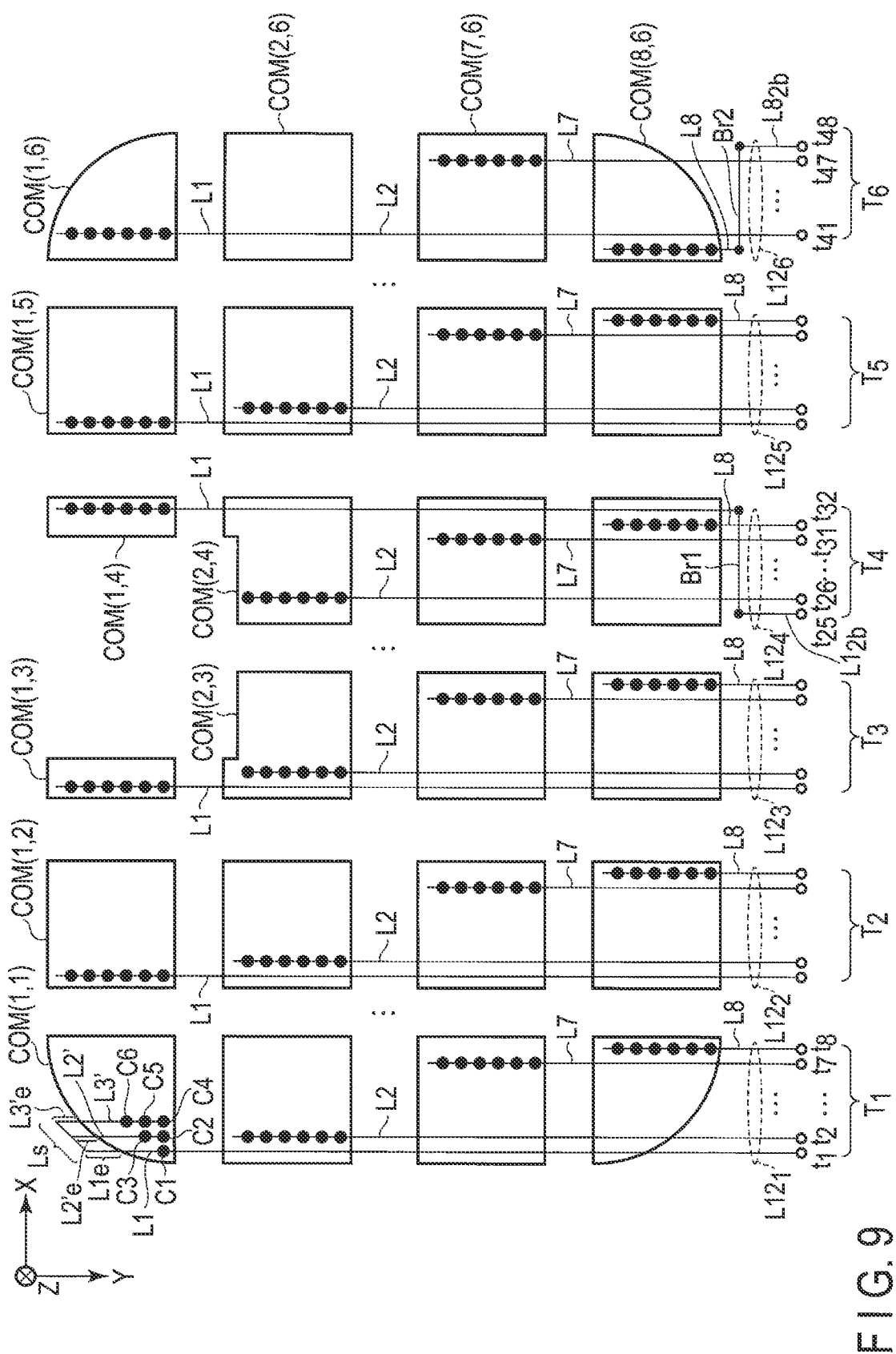
FIG. 9 is a view showing an example of connection between the driver and the display panel for touch detection according a third embodiment.

FIG. 9 shows an example of connection between the sensor electrodes COM for touch detection and the sensor electrode driver 26, in the touch panel display device DSP according to the third embodiment. The touch panel display device according to the third embodiment includes the display panel PNL in an approximately rectangular odd shape in which four corners are arcuate, similarly to the second embodiment.

The terminal $t_1$ to $t_{48}$ of the detection driver R2 are grouped to correspond to the sensor electrodes in each column, similarly to the first embodiment. As regards mapping between the eight terminals $t_{8(n-1)+1}$ to $t_{8(n-1)+8}$ in each terminal group and the sensor electrodes COM(1, n) to COM(8, n) of a sensor electrode group, the first mapping or the second mapping is entirely adopted for all of the sensor electrode groups, similarly to the first embodiment. FIG. 9 shows an example adopting the first mapping.

In the third embodiment, in the sensor electrodes COM other than the sensor electrodes COM(1,4) to COM(8,4) in the fourth column from the left corresponding to the recess 98, the line L1 is located at the leftmost position in line group $L1^2n$ since the line L1 is connected to the terminal $t_{8(n-1)+1}$, and the line L8 is located at the rightmost position since the line L8 is connected to the terminal $t_{8(n-1)+8}$. The line L2 connected to the sensor electrode COM(2, n) second farthest from the wiring substrate F and the terminal $t_{8(n-1)+2}$, the line L3 connected to the sensor electrode COM(3, n) and the terminal $t_{8(n-1)+3}$, . . . and the line L7 connected to the sensor electrode COM(7, n) and the terminal $t_{8(n-1)+7}$ are located in this order from the left between the lines L1 and L8. Each of lines L1 to L8 is connected to each of the sensor electrodes COM(1, n) to (8, n) via a predetermined number (six in the example shown in FIG. 9) of contacts (black points in the figure).

In the sensor electrodes COM(1,4) to COM(8,4) in the fourth column from the left, the line L1 connected to the sensor electrode COM(1,4) is placed at the rightmost position of the line group $L1^2n$, similarly to the first embodiment shown in FIG. 6 and FIG. 7A. The rightmost terminal $t_{8(n-1)+8}$ of the eight terminals $t_{8(n-1)+1}$ to $t_{8(n-1)+8}$ in each terminal group $T_n$ corresponds to the sensor electrode COM (8, n) closest to the wiring substrate F. The leftmost terminal $t_{8(n-1)+1}$ corresponds to the sensor electrode COM(1, n) farthest from the wiring substrate F. Therefore, an end of the first half $L1_{2a}$ of the second lead portion of the line L1 on the wiring substrate F side is connected to the second half $L1_{2b}$ of the second lead portion of the line L1 extending in the Y direction from a terminal $t_{25}$ of the detection driver R2 (the leftmost terminal in the terminal group $T_4$ corresponding to the sensor electrodes COM(1,4) to COM(8,4)) via a bridge line Br1 extending in the X direction, in the peripheral area SA.

Thus, the arrangement of the lines can be changed in the peripheral area SA. The leftmost terminal $t_{25}$ in the terminal group $T_4$ corresponding to the sensor electrodes COM(1,4) to COM(8,4) can be connected to the sensor electrode COM(1,4) farthest from the wiring substrate F. That is, the arrangement of the lines L1 to L8 in the sensor electrodes COM(1,4) to COM(8,4) is the lines L2 to L8, and L1 in this order from the left, in the display area DA. The lines L2 to L8 are connected to the sensor electrodes COM(2,4) to COM(8,4), respectively, and the line L1 is connected to the sensor electrode COM(1,4). The positions of six contacts formed in the respective sensor electrodes in the Y direction may be aligned.

In the sensor electrodes COM(1,4) to COM(8,4), the number of lines having their arrangement changed with the bridge line Br1 is not limited to one. For example, if the depth (the length in the Y direction) of the recess is large and a sufficient number of contacts with the sensor electrode COM(2,4) cannot be made on the line which is connected to the terminal $t_{26}$ and which extends in the Y direction, the line L2 connected to the sensor electrode COM(2,4) may also be arranged at the second position from the right, i.e., the left of the line L1, in the line group $L12_4$. Further, the end of the first half $L2_{2a}$ of the second lead portion on the wiring substrate F side of the line L2 may be connected to the second half $L2_{2b}$ of the second lead portion of the line L2 extending in the Y direction from the terminal $t_{26}$ of the detection driver R2, via a second bridge line extending in the X direction in the peripheral area SA.

In the sensor electrodes COM(1,1) to COM(8,1) in the leftmost column, contacts C2 to C6 other than the contact C1 with the line L1 are formed at the positions other than the line L1, in the sensor electrode COM(1,1), similarly to the first embodiment shown in FIG. 6 and FIG. 7B.

To connect the line L1 to the contacts C1 to C6, the line L1 connected to the contact C1 includes the first lead portion L1e drawn to the peripheral area SA on the opposite side (the negative side in the Y direction) to the detection driver R2. The sub-line L2' is connected to the contacts C2 and C3. The first lead portion L2'e of the sub-line L2' is drawn to the peripheral area SA on the opposite side (the negative side in the Y direction) to the detection driver R2. The sub-line L3' is connected to the contacts C4, C5, and C6. The first lead portion L3'e of the sub-line L3' is drawn to the peripheral area SA on the opposite side (the negative side in the Y direction) to the detection driver R2.

Tips of the first lead portions L1e, L2'e, and L3'e are connected to one another by a coupling line Ls in the peripheral area SA. Thus, the line L1 connected to the terminal $t_1$ (the leftmost terminal in the terminal group $T_1$) of the detection driver R2 is connected to the sensor electrode COM(1,1) via six contacts C1 to C6.

Figure 10A:
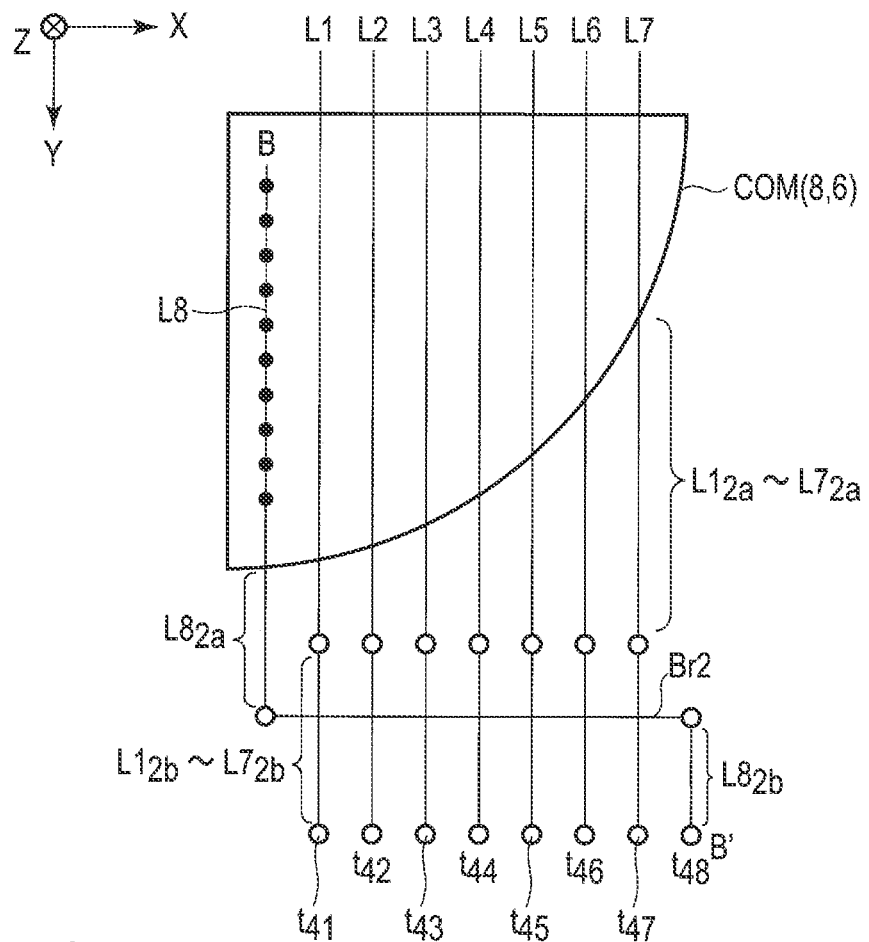
FIG. 10A is an enlarged view showing an example of a sensor electrode COM(8,6) according to the third embodiment.

In the sensor electrodes COM(1,6) to COM(8,6) in the rightmost column, the sensor electrode COM(8,6) closest to the wiring substrate F is rounded at its lower right corner in accordance with a shape of the round corner C32 of the display area DA. Therefore, the line L8 connected to the sensor electrode COM(8,6) is placed on the leftmost side of the line group $L12_6$. FIG. 10A is an enlarged plan view of the sensor electrode COM(8,6). The rightmost terminal $t_{8(n-1)+8}$ of the eight terminals $t_{8(n-1)+1}$ to $t_{8(n-1)+8}$ in each terminal group $T_n$ corresponds to the sensor electrode COM (8, n) closest to the wiring substrate F. The leftmost terminal $t_{8(n-1)+1}$ corresponds to the sensor electrode COM(1, n) farthest from the wiring substrate F. Therefore, an end of the first half $L8_{2a}$ of the second lead portion of the line L8 in the peripheral area SA on the wiring substrate F side is connected to the second half $L8_{2b}$ of the second lead portion of the line L8 extending in the Y direction from a terminal $t_{48}$ of the detection driver R2 (the rightmost terminal in the terminal group $T_6$ corresponding to the sensor electrodes COM(1,6) to COM(8,6)), via a bridge line Br2 extending in the X direction. The bridge line Br2 and the second half $L8_{2b}$ of the second lead portion are formed by different layers, and the bridge line Br2 and the second half $L8_{2b}$ of the second lead portion are connected through contact holes (white circles in FIG. 10A). The bridge line Br2 is not necessary for the other lines L1 to L7, and ends of the first halves $L1_{2a}$ to $L7_{2a}$ of the second lead portions in the peripheral area SA on the wiring substrate F side are connected to the second halves $L1_{2b}$ to $L72b$ of the second lead portions connected to the terminals $t_{41}$ to $t_{47}$ of the detection driver R2 through the contact holes.

Figure 10B:
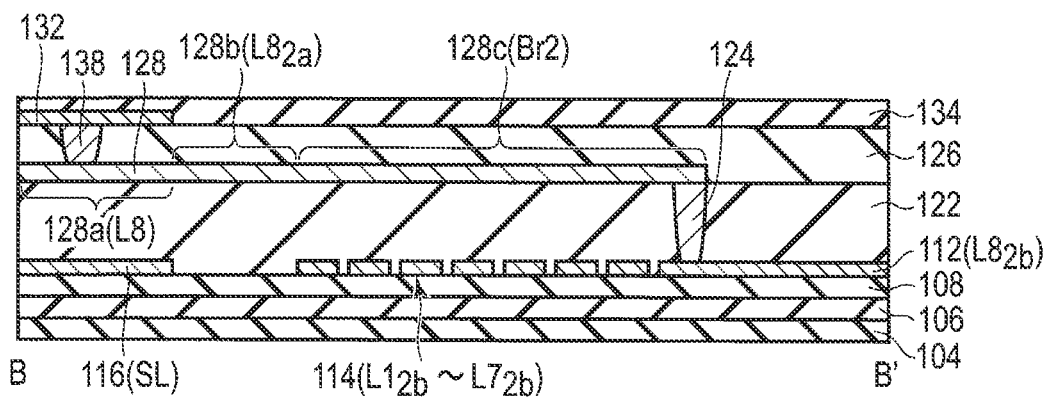
FIG. 10B is a cross-sectional view seen along line B-B' of FIG. 10A.

As explained in the first embodiment, a layer forming the bridge line Br2 can be arbitrarily selected from layers different from a layer forming the second halves $L1_{2b}$ to $L8_{2b}$ of the second lead portions. For example, FIG. 10B is a cross-sectional view seen along line B-B' of FIG. 10A in a case where the bridge line Br2 is formed of a third metal layer 128. An insulating layer 106 of an inorganic film is formed on a base 104. A semiconductor layer formed of a polysilicon layer is formed between the base 104 and the insulating layer 106, at a portion other than FIG. 10B. An insulating layer 108 of an inorganic film is formed on the insulating layer 106. A scanning line layer (also called a gate line layer or a first metal layer) of, for example, a molybdenum tungsten alloy (MoW) is formed between the insulating layer 106 and the insulating layer 108, at portions other than FIG. 10B.

Signal line layers (also called source line layers or second metal layers) of, for example, titanium nitride/titanium/aluminum/titanium (TiN/Ti/AL/Ti) 112, 114, and 116 are formed on the insulating layer 108. The signal line layer 112 forms the second half $L8_{2b}$ of the second lead portion of the line L8. The signal line layer 114 forms the second halves $L1_{2b}$ to L72b of the second lead portions of the lines L1 to L7. The signal line layer 116 forms the source line SL. A first insulating layer (first HRC layer) 122 of an organic film is formed on the signal line layers 112, 114, and 116. Similarly, a second insulating layer (second HRC layer) 126 of an organic film is formed on the first HRC layer 122. A third metal layer 128 of, for example, a titanium nitride/titanium/aluminum/titanium (TiN/Ti/AL/Ti) layer is formed between the first HRC layer 122 and the second HRC layer 126. The third metal layer 128 includes a first portion 128a forming the line L8, a second portion 128b forming the first half $L8_{2a}$ of the second lead portion of the line L8, and a third portion 128c forming the bridge line Br2. The third metal layer 128 forms the lines L1 to L7, and the first halves $L1_{2a}$ to $L7_{2a}$ of the second lead portions of the lines L1 to L7, at portions other than FIG. 10B. A tip of the first portion 128b of the third metal layer 128 (a tip of the first half $L8_{2a}$ of the second lead portion of the line L8) is connected to the signal line layer 112 (the second half $L8_{2b}$ of the second lead portion of the line L8) through a contact hole 124 formed in the first HRC layer 122.

An insulating layer 134 of an inorganic film is formed on the second insulating layer 126. A first ITO layer 132 forming the common electrodes COM is formed between the second HRC layer 126 and the insulating layer 134. The sensor electrode COM(first ITO layer) 132 is connected to the first portion 128a (line L8) of the third metal layer 128 through a contact hole 138 formed in the second HRC layer 126. The line L8 includes the first half $L8_{2a}$ of the second lead portion and the second half $L8_{2b}$ of the second lead portion which are drawn to the peripheral area SA on the terminal portion side and the bridge line Br2 connecting the first half $L8_{2a}$ of the second lead portion and the second half $L8_{2b}$ of the second lead portion to each other. Each of the other lines L1 to L7 also includes the first half of the second lead portion and the second half of the second lead portion which are drawn to the peripheral area SA on the terminal portion side.

Thus, the first half $L8_{2a}$ of the second lead portion and the bridge line Br2 are formed in the third metal layer 128, and the second halves $L1_{2b}$ to $L8_{2b}$ of the second lead portions are formed in the signal line layers 114 and 112. Therefore, the first halves $L1_{2a}$ to $L7_{2a}$ of the second lead portions of the lines L1 to L7 and the second halves $L1_{2b}$ to L72b of the second lead portions of the lines L1 to L7 are connected through a contact hole formed in the first HRC layer 122, at a portion other than FIG. 10B. The second halves $L1_{2b}$ to L72b of the second lead portions of the lines L1 to L7 are located between the first half $L8_{2a}$ of the second lead portion and the second half $L8_{2b}$ of the second lead portion of the line L8. The bridge line Br2 is formed integrally with the first half $L8_{2a}$ of the second lead portion of the line L8 by the third metal layer 128, bent from an end of the first lead portion $L8_{2a}$ to the X direction, and connected to the second half $L8_{2b}$ of the second lead portion formed by the signal line layer 112 through the contact hole 124 of the first HRC layer 122. The bridge line Br2 and the second halves $L1_{2b}$ to L72b of the second lead portions of the lines L1 to L7 are isolated via the first HRC layer 122. The bridge line Br2 overlaps the second halves $L1_{2b}$ to L72b of the second lead portions of the lines L1 to L7.

A video signal line connected to the sensor electrode COM 132 overlaps the source line 116 and is drawn to the source driver 24 but, in the embodiments, since the line group for touch detection connected to the sensor electrodes COM is noticed, illustration of details of the drawn line structure for the video signal line is omitted to make the embodiments easily understood.

Figure 11A:
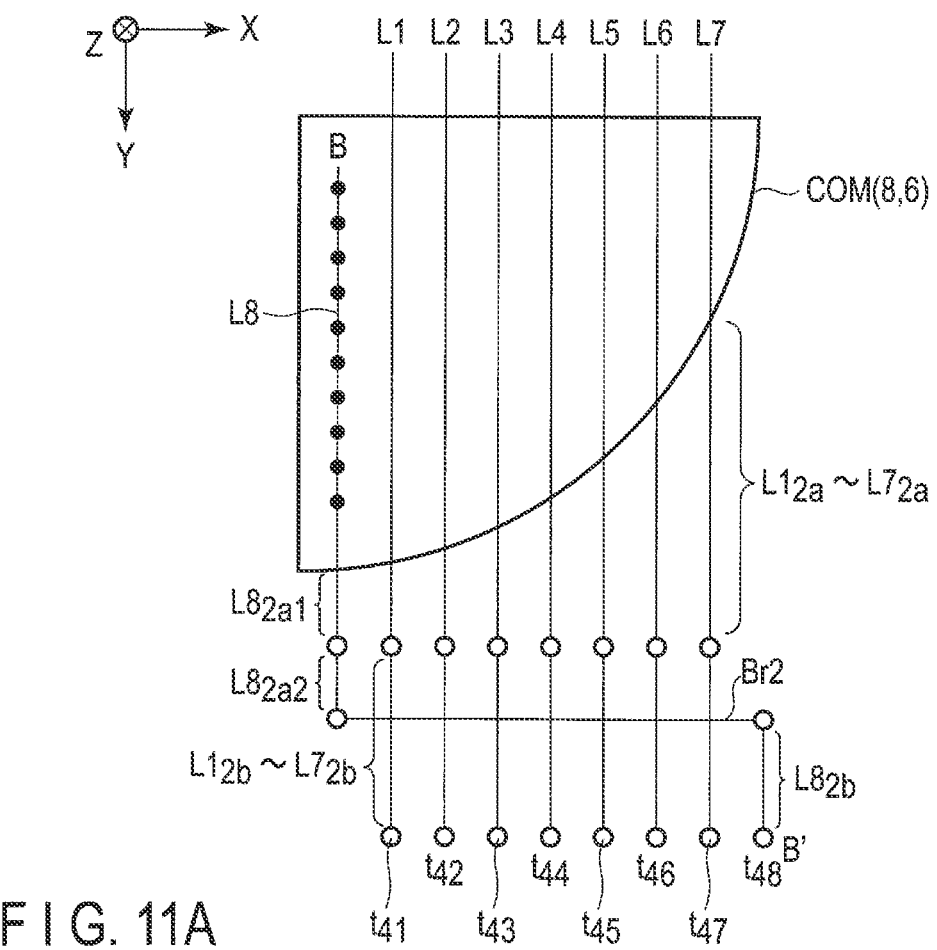
FIG. 11A is an enlarged view showing another example of the sensor electrode COM(8,6) according to the third embodiment.
Figure 11B:
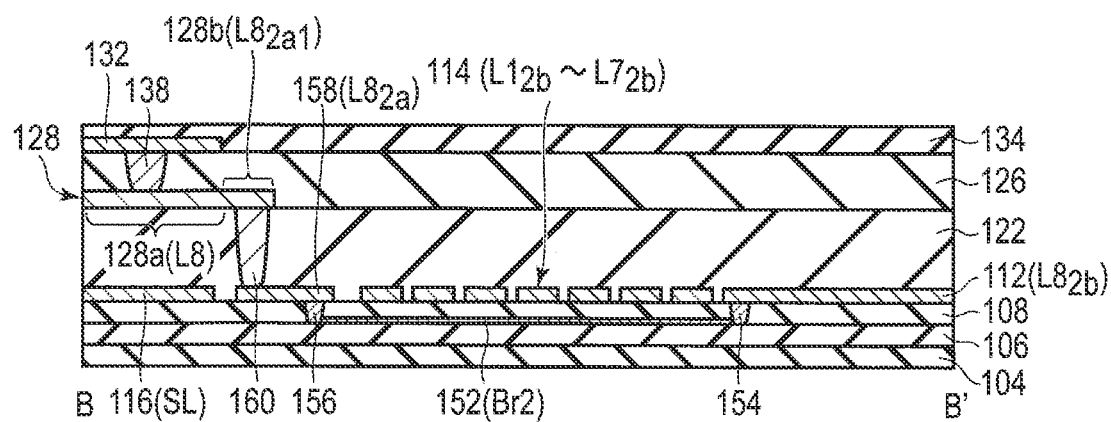
FIG. 11B is a cross-sectional view seen along line B-B' of FIG. 11A.

FIGS. 11A and 11B show another example of the sensor electrode COM(8,6). FIG. 11A is an enlarged plan view of the other example of the sensor electrode COM(8,6). In this example, the first half $L8_{2a}$ of the second lead portion of the line L8 includes a first portion $8_{2a1}$ and a second portion $L8_{2a2}$ connected to each other via a contact hole. The structure other than this is the same as that in FIG. 10A. FIG. 11B is a cross-sectional view seen along line B-B' of FIG. 11A in a case where the bridge line Br2 is formed of the first metal layer between the insulating layers 106 and 108. The insulating layer 106 of an inorganic film is formed on the base 104. A semiconductor layer formed of a polysilicon layer is formed between the base 104 and the insulating layer 106, at a portion other than FIG. 11B. The insulating layer 108 of an inorganic film is formed on the insulating layer 106. A scanning line layer (also called a gate line layer or a first metal layer) 152 of, for example, a molybdenum tungsten alloy (MoW) is formed between the insulating layer 106 and the insulating layer 108. The scanning line layer 152 forms the bridge line Br2.

The signal line layers (also called source line layers or second metal layers) of, for example, titanium nitride/titanium/aluminum/titanium (TiN/Ti/AL/Ti) 112, 114, 158, and 116 are formed on the insulating layer 108. The signal line layer 112 forms the second half $L8_{2b}$ of the second lead portion of the line L8. The signal line layer 114 forms the second halves $L1_{2b}$ to L72b of the second lead portions of the lines L1 to L7. The signal line layer 158 forms the second portion $L8_{2a2}$ of the first half $L8_{2a}$ of the second lead portion of the line L8. The signal line layer 116 forms the source line SL. The signal line 112 (the second half $L8_{2b}$ of the second lead portion of the line L8) is connected to one of ends of the scanning line layer 152 (bridge line Br2) through a contact hole 154 formed in the insulating layer 108. The signal line 158 (second portion $L8_{2a2}$ of the first half $L8_{2a}$ of the second lead portion of the line L8) is connected to the other end of the scanning line layer 152 (bridge line Br2) through a contact hole 156 formed in the insulating layer 108.

The first insulating layer (first HRC layer) 122 of an organic film is formed on the signal line layers 112, 114, 158, and 116. Similarly, the second insulating layer (second HRC layer) 126 of an organic film is formed on the first HRC layer 122. The third metal layer 128 of, for example, a titanium nitride/titanium/aluminum/titanium (TiN/Ti/AL/Ti) layer is formed between the first HRC layer 122 and the second HRC layer 126. The third metal layer 128 includes a first portion 128a forming the line L8, and a second portion 128b forming the first portion $L8_{2a1}$ of the first half of the second lead portion of the line L8. The second portion 128b ($L8_{2a1}$) of the third metal layer 128 is connected to the signal line 158 ($L8_{2a2}$) through a contact hole 160 formed in the first HRC layer 122. The third metal layer 128 forms the lines L1 to L7, and the first halves $L1_{2a}$ to $L7_{2a}$ of the second lead portions of the lines L1 to L7, at portions other than FIG. 11B.

The insulating layer 134 of an inorganic film is formed on the second insulating layer 126. The first ITO layer 132 forming the common electrodes COM is formed between the second HRC layer 126 and the insulating layer 134. The sensor electrode COM(first ITO layer) 132 is connected to the first portion 128a (line L8) of the third metal layer 128 through a contact hole 138 formed in the second HRC layer 126. The line L8 includes the first halves $L8_{2a1}$ and $L8_{2a2}$ of the second lead portions and the second half $L8_{2b}$ of the second lead portion which are drawn to the peripheral area SA on the terminal portion side, and the bridge line Br2 connecting the lead portion $L8_{2a2}$ and the second half $L8_{2b}$ of the second lead portion to each other. Each of the other lines L1 to L7 also includes the first half $L1_{2a}$ of the second lead portion and the second half $L1_{2b}$ of the second lead portion which are drawn to the peripheral area SA on the terminal portion side.

The first halves $L1_{2a}$ to $L7_{2a}$ of the second lead portions of the lines L1 to L7 are formed in the third metal layer 128, and the second halves $L1_{2b}$ to L72b of the second lead portions are formed in the signal line layer 114. Therefore, the first halves $L1_{2a}$ to $L7_{2a}$ of the second lead portions of the lines L1 to L7 and the second halves $L1_{2b}$ to L72b of the second lead portions of the lines L1 to L7 are connected through a contact hole formed in the first HRC layer 122, at a portion other than FIG. 11B. The second halves $L1_{2b}$ to L72b of the second lead portions of the lines L1 to L7 are located between the first half $L8_{2a2}$ of the second lead portion and the second half $L8_{2b}$ of the second lead portion of the line L8. The bridge line Br2 is formed by the scanning line layer 152 extending in the X direction. The bridge line Br2 and the second halves $L1_{2b}$ to L72b of the second lead portions of the lines L1 to L7 are isolated via the insulating layer 108. The bridge line Br2 overlaps the second halves $L1_{2b}$ to L72b of the second lead portions of the lines L1 to L7.

A video signal line connected to the sensor electrode COM 132 overlaps the source line 116 and is drawn to the source driver 24 but, in the embodiments, since the line group for touch detection connected to the sensor electrodes COM is noticed, illustration of details of the drawn line structure for the video signal line is omitted to make the embodiments easily understood.

Thus, the position of the line L8 can be changed from the leftmost position to the rightmost position in the peripheral area SA on the wiring substrate F side. The rightmost terminal $t_{48}$ in the terminal group $T_6$ corresponding to the sensor electrodes COM(1,6) to COM(8,6) can be connected to the sensor electrode COM(8,6) closest to the wiring substrate F. That is, the arrangement of the lines L1 to L8 in the sensor electrodes COM(1,6) to COM(8,6) is the lines L8, L1 to L7 in this order from the left, in the display area DA. The lines L1 to L7 are connected to the sensor electrodes COM(1,6) to COM(7,6). The line L8 is connected to the sensor electrode COM(8,6). The positions of six contacts formed in the respective sensor electrodes in the Y direction may be aligned.

In the sensor electrodes COM(1,6) to COM(8,6), the number of lines having the arrangement changed with the bridge line Br2 is not limited to one.

If the recess 98 is not present, connection may be made based on the first mapping, in the sensor electrodes COM (1,4) to COM(8,4), similarly to the other sensor electrode COM groups. In this case, the bridge line Br2 is unnecessary.

FIG. 9 shows an example in which the first mapping is adopted, but the second mapping may be adapted similarly to the first embodiment. In this case, the detection driver R2 and the sensor electrodes COM are connected by the wiring pattern obtained by laterally reversing the wiring pattern of FIG. 9.

In a display device adopting the second mapping and including no recess 98, connection is also made based on the second mapping, in the sensor electrodes COM(1,4) to COM(8,4), similarly to the other sensor electrode COM groups.

If a display device has an odd shape in which four corners are round corners and the recess is formed at the center part of the upper side, sufficient number of contacts cannot be made. According to the third embodiment, by adopting different mapping for the left and right parts in the sensor electrode group, connecting plural lines of contacts of the sensor electrodes having a round corner at the peripheral portion farthest from the wiring substrate F, and replacing the arrangement of the lines in the peripheral area SA between the detection driver R2 and the sensor electrodes COM, contacts between the sensor electrodes COM and the detection driver R2 can be secured.

Fourth Embodiment

Figure 12:
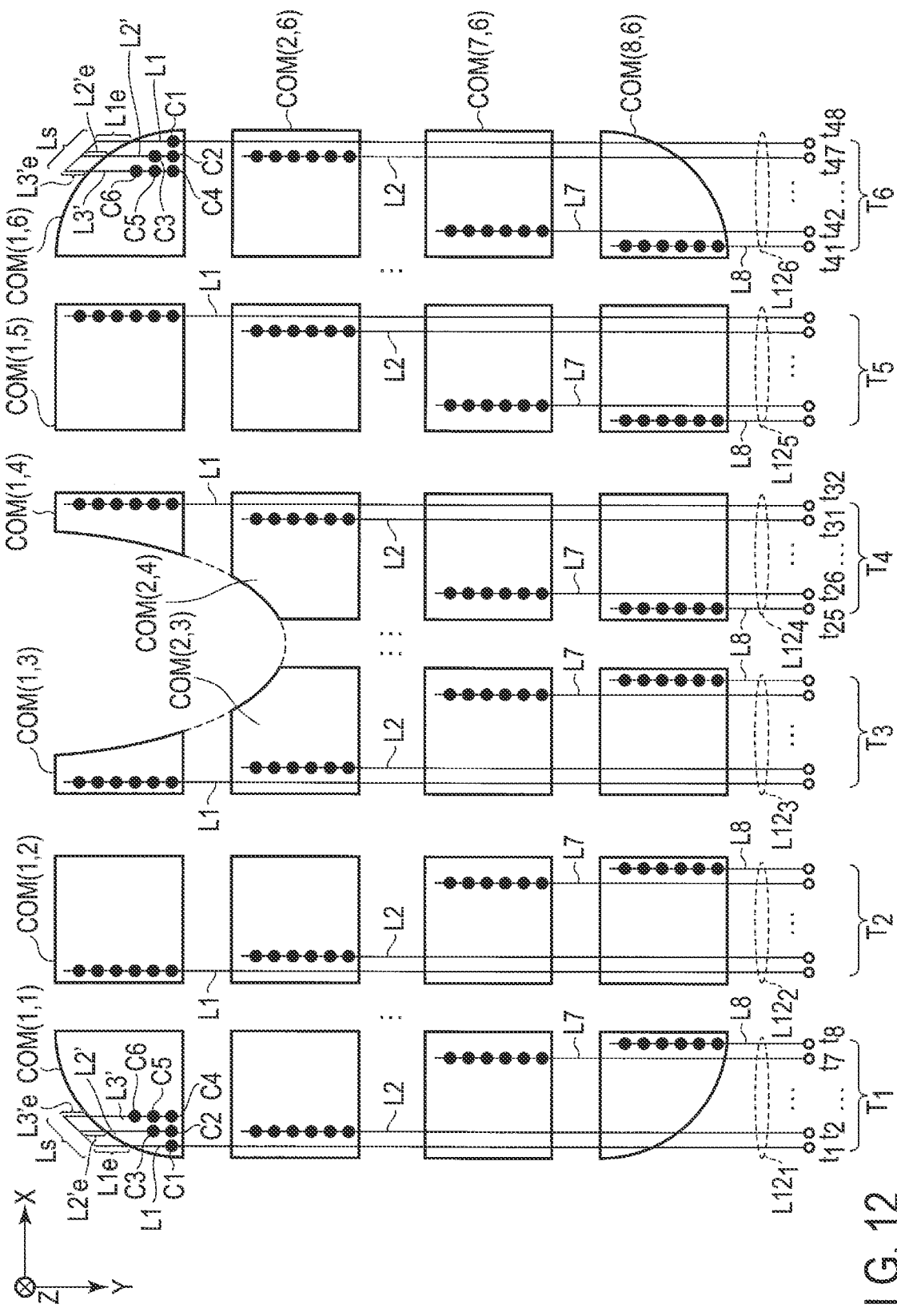
FIG. 12 is a view showing an example of connection between the driver and the display panel for touch detection according a fourth embodiment.

FIG. 12 shows an example of connection between the sensor electrodes COM for touch detection and the sensor electrode driver 26, in the touch panel display device DSP according to the fourth embodiment. The touch panel display device according to the fourth embodiment includes the display panel PNL in an approximately rectangular odd shape in which four corners are arcuate, similarly to the second embodiment. The shape of the recess 98 is not arcuate but an arch shape which is narrower in width in the X direction as the Y-directional position advances. Therefore, opposed sides of sensor electrodes COM(1,3) and COM(1,4) and opposed sides of sensor electrodes COM(2,3) and COM(2,4) draw a parabola in planar view.

The terminal $t_1$ to $t_{48}$ of the detection driver R2 are grouped to correspond to the sensor electrode COM in each column, similarly to the first embodiment. The left half part and the right half part of the sensor electrode group are different with respect to mapping between eight terminals $t_{8(n-1)+1}$ to $t_{8(n-1)+8}$ in each terminal group and sensor electrodes COM(1, n) to COM(8, n). The first mapping is adopted for the sensor electrodes COM(1,1) to COM(8,1) in the leftmost column, the sensor electrodes COM(1,2) to COM(8,2) in the second column from the left, and the sensor electrodes COM(1,3) to COM(8,3) in the third column from the left. The second mapping is adopted for the sensor electrodes COM(1,6) to COM(8,6) in the rightmost column, the sensor electrodes COM(1,5) to COM(8,5) in the second column from the right, and the sensor electrodes COM(1,4) to COM(8,4) in the third column from the right.

The second mapping may be adopted for the sensor electrodes COM(1,2) to COM(8,2) in the second column from the left and the first mapping may be adopted for the sensor electrodes COM(1,5) to COM(8,5) in the second column from the right.

In the sensor electrodes COM(1,1) to COM(8,1), COM (1,2) to COM(8,2), and COM(1,3) to COM(8,3) in three left columns that adopt the first mapping, the line L1 is located on the leftmost side (edge E3 side) in planar view of FIG. 8, the line L8 is located on the rightmost side (edge E4 side), and the lines L2, L3, . . . L7 are located in this order from the left to the right, between the lines L1 and L8.

In the sensor electrodes COM(1,4) to COM(8,4), COM (1,5) to COM(8,5), and COM(1,6) to COM(8,6) in three right columns that adopt the second mapping, the line L1 is located on the rightmost side (edge E4 side) in planar view of FIG. 8, the line L8 is located on the leftmost side (edge E3 side), and the lines L2, L3, . . . L7 are located in this order from the right to the left, between the lines L1 and L8.

In the sensor electrodes COM(1,1) to COM(8,1) in the leftmost column, similarly to the first embodiment, the first lead L1e of the line L1 connected to the contact C1, the first lead L2'e of the sub-line L2' connected to the contacts C2 and C3, and the first lead L3'e of the sub-line L3' connected to the contacts C4, C5, and C6 are connected by the coupling line Ls in the peripheral area SA. The line L1 extending in the Y direction from the terminal $t_1$ (the leftmost terminal in the terminal group $T_1$) of the detection driver R2 is connected to the sensor electrode COM(1,1) via the six contacts C1 to C6.

In the sensor electrodes COM(1,6) to COM(8,6) in the rightmost column, the sensor electrode COM(1,6) farthest from the wiring substrate F is rounded at its upper right corner in accordance with the shape of the round corner C34 of the display area DA. Therefore, the sensor electrode COM(1,6) may not be able to make a sufficient number of contacts with the line L1 connected to the terminal $t_{48}$ (the rightmost terminal in the terminal group $T_6$) of the detection driver R2. In the example shown in FIG. 12, only one contact C1 can be formed at the position of the line L1, in the sensor electrode COM(1,6). Therefore, the contacts C2 to C6 are formed at positions different from the line L1, in the sensor electrode COM(1,6).

To connect the line L1 to the contacts C1 to C6, the line L1 connected to the contact C1 includes the first lead portion L1e drawn to the peripheral area SA on the opposite side (the negative side in the Y direction) to the detection driver R2. The sub-line L2' connected to the contacts C2 and C3 includes the first lead portion L2'e drawn to the peripheral area SA on the opposite side (the negative side in the Y direction) to the detection driver R2. The sub-line L3' connected to the contacts C4, C5, and C6 includes the first lead portion L3'e drawn to the peripheral area SA on the opposite side (the negative side in the Y direction) to the detection driver R2.

Tips of the first lead portions L1e, L2'e, and L3'e are connected to one another by the coupling line Ls in the peripheral area SA. Thus, the line L1 connected to the terminal $t_{48}$ (the rightmost terminal in the terminal group $T_6$) of the detection driver R2 is connected to the sensor electrode COM(1,1) via the six contacts C1 to C6.

The sub-line L2' may be formed to be noncontact with the line L2 in an extension of the line L2 which is connected to the terminal $t_{47}$ (the second terminal from the right in the terminal group $T_6$) of the detection driver R2. The sub-line L3' may be formed to be noncontact with the line L3 in an extension of the line L3 which is connected to the terminal $t_{46}$ (the third terminal from the right in the terminal group $T_6$) of the detection driver R2. Y-directional positions of the contacts C1, C2, and C4 may be aligned. Similarly, Y-directional positions of the contacts C3 and C5 may be aligned. Furthermore, Y-directional positions of the contacts C1 to C6 may be aligned with the contacts of the other sensor electrodes COM(1,1) to COM(1,5) in the same row.

According to the fourth embodiment, since the mapping on the right half is different from the mapping on the left half, the lines connected to the detection driver R2 can be connected to the sensor electrodes COM even if the sensor electrodes COM having an odd shape corresponding to the shapes of the round corners of the display area DA and the recess exist at laterally symmetrical positions of the display area DA.

If the recess 98 is not present, the first mapping may be adapted similarly to FIG. 12 for the sensor electrodes COM(1,3) to COM(8,3) relating to the recess 98 or the second mapping may be adopted for the sensor electrodes COM(1,3) to COM(8,3). Similarly, the second mapping may be adopted similarly to FIG. 12 for the sensor electrodes COM(1,4) to COM(8,4) relating to the recess 98 or the first mapping may be adopted for the sensor electrodes COM(1, 4) to COM(8,4).

Fifth Embodiment

Figure 13:
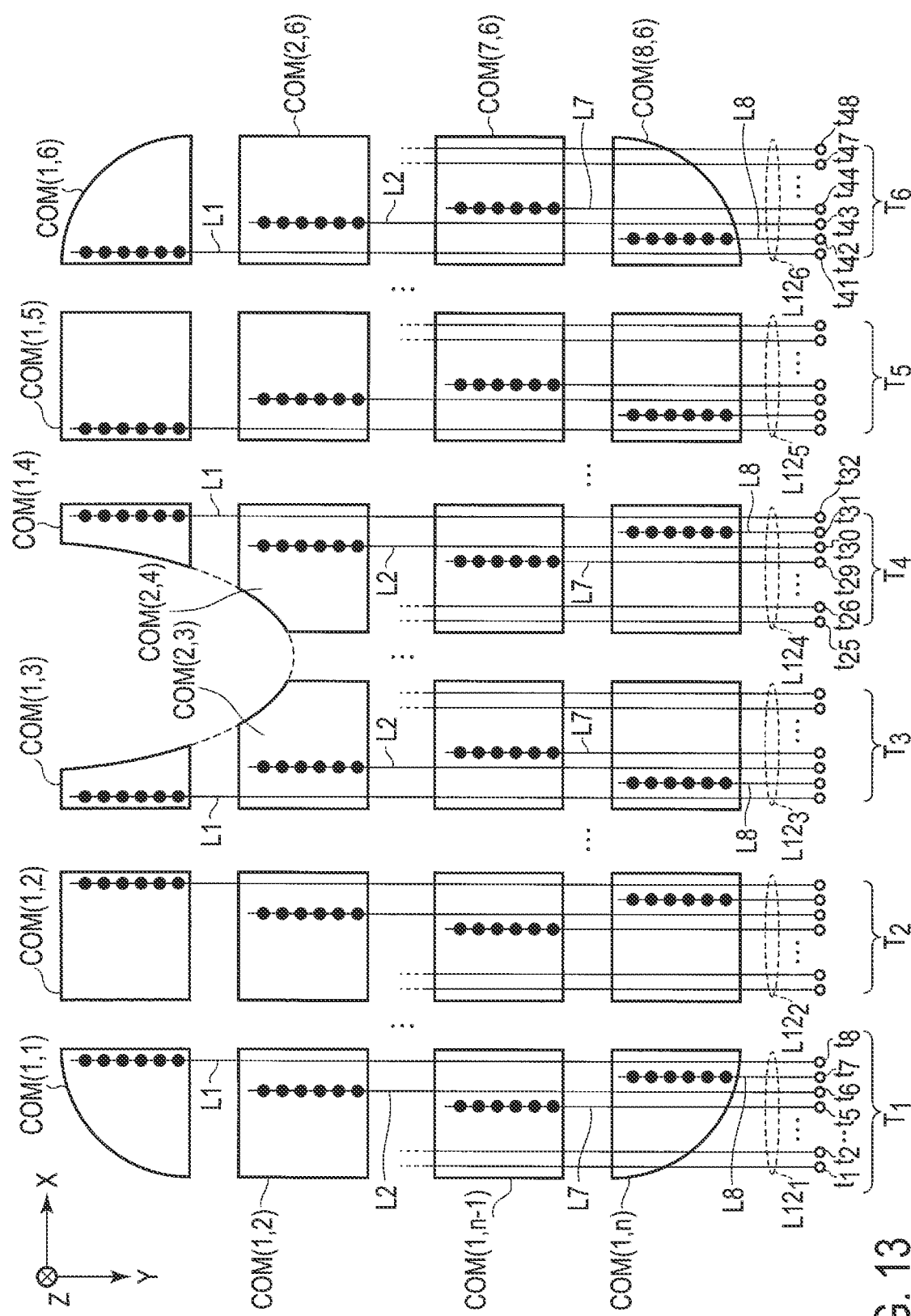
FIG. 13 is a view showing an example of connection between the driver and the display panel for touch detection according a fifth embodiment.

FIG. 13 shows an example of connection between the sensor electrodes COM for touch detection and the sensor electrode driver 26, in the touch panel display device DSP according to the fifth embodiment. In the fifth embodiment, the shape of the recess 98 is not arcuate but an arch shape which is narrower in width in the X direction as the Y-directional position advances. The first mapping or the second mapping is adopted in the above-explained embodiments, but third mapping is adopted in the third embodiment. In the third mapping, the positions of the sensor electrodes are alternately changed from a far side to a close side or from the close side to the far side as the position of the terminal of the detection driver R2 is changed from the left to the right. The third mapping is classified into third-A mapping and third-B mapping depending on whether the sensor electrode farthest from the wiring substrate F corresponds to the rightmost terminal or the leftmost terminal in the terminal group.

For example, in the third-A mapping, the leftmost terminal $t_{8(n-1)+1}$ of the eight terminals $t_{8(n-1)+1}$ to $t_{8(n-1)+8}$ in each terminal group $T_n$ corresponds to the sensor electrode COM(1, n) farthest from the wiring substrate F;

the second terminal $t_{8(n-1)+2}$ from the left corresponds to the sensor electrode COM(8, n) closest to the wiring substrate F;

the third terminal $t_{8(n-1)+3}$ from the left corresponds to the sensor electrode COM(2, n) second farthest from the wiring substrate F;

the fourth terminal $t_{8(n-1)+4}$ from the left corresponds to the sensor electrode COM(7, n) second closest to the wiring substrate F;

the fifth terminal $t_{8(n-1)+5}$ from the left corresponds to the sensor electrode COM(3, n) third farthest from the wiring substrate F;

the sixth terminal $t_{8(n-1)+6}$ from the left corresponds to the sensor electrode COM(6, n) third closest to the wiring substrate F;

the seventh terminal $t_{8(n-1)+7}$ from the left corresponds to the sensor electrode COM(4, n) fourth farthest from the wiring substrate F; and the eighth terminal from the left (rightmost terminal) $t_{8(n-1)+6}$ corresponds to the sensor electrode COM(5, n) fourth closest to the wiring substrate F.

The third-B mapping executed by laterally reversing the third-A mapping, and in the third-B mapping, the rightmost terminal $t_{8(n-1)+8}$ of the eight terminals $t_{8(n-1)+1}$ to $t_{8(n-1)+8}$ in each terminal group $T_n$ corresponds to the sensor electrode COM(1, n) farthest from the wiring substrate F;

the second terminal $t_{8(n-1)+7}$ from the right corresponds to the sensor electrode COM(8, n) closest to the wiring substrate F;

the third terminal $t_{8(n-1)+6}$ from the right corresponds to the sensor electrode COM(2, n) second farthest from the wiring substrate F;

the fourth terminal $t_{8(n-1)+5}$ from the right corresponds to the sensor electrode COM(7, n) second closest to the wiring substrate F;

the fifth terminal $t_{8(n-1)+4}$ from the right corresponds to the sensor electrode COM(3, n) third farthest from the wiring substrate F;

the sixth terminal $t_{8(n-1)+3}$ from the right corresponds to the sensor electrode COM(6, n) third closest to the wiring substrate F;

the seventh terminal $t_{8(n-1)+2}$ from the right corresponds to the sensor electrode COM(4, n) fourth farthest from the wiring substrate F; and the eighth terminal from the right (leftmost terminal) $t_{8(n-1)+1}$ corresponds to the sensor electrode COM(5, n) fourth closest to the wiring substrate F.

In the fifth embodiment, the third-A mapping or the third-B mapping is adopted for each sensor electrode group. The third-A mapping is adopted for the sensor electrodes COM(1,3) to COM(8,3) in the third column from the left and the sensor electrodes COM(1,6) to COM(8,6) in the sixth column from the left (the rightmost column). The third-B mapping is adapted for the sensor electrodes COM(1,1) to COM(8,1) in the leftmost column and the sensor electrodes COM(1,4) to COM(8,4) in the fourth column from the left. The third-A mapping or the third-B mapping may be adopted for the sensor electrodes COM(1,2) to COM(8,2) in the second column from the left and the sensor electrodes COM(1,5) to COM(8,5) in the fifth column from the left, but the third-B mapping is adopted for the sensor electrodes COM(1,2) to COM(8,2) in the second column from the left and the third-A mapping is adopted for the sensor electrodes COM(1,5) to COM(8,5) in the fifth column from the left.

Therefore, in the sensor electrodes COM(1,3) to COM(8, 3) in the third column from the left, the sensor electrodes COM(1,5) to COM(8,5) in the fifth column from the left, and the sensor electrodes COM(1,6) to COM(8,6) in the sixth column from the left (rightmost column) that adopt the third-A mapping, the leftmost terminal $t_{8(n-1)+1}$ of the eight terminals $t_{8(n-1)+1}$ to $t_{8(n-1)+8}$ in each terminal group $T_n$ is connected to the line L1, the second terminal $t_{8(n-1)+2}$ from the left is connected to the line L8, the third terminal $t_{8(n-1)+3}$ from the left is connected to the line L2, the fourth terminal $t_{8(n-1)+4}$ from the left is connected to the line L7, the fifth terminal $t_{8(n-1)+5}$ from the left is connected to line L3, the sixth terminal $t_{8(n-1)+6}$ from the left is connected to the line L6, the seventh terminal $t_{8(n-1)+7}$ from the left is connected to the line L4, and the eighth terminal from the left (rightmost terminal) $t_{8(n-1)+8}$ is connected to the line L5.

In the sensor electrodes COM(1,1) to COM(8,1) in the leftmost column, the sensor electrodes COM(1,2) to COM (8,2) in the second column from the left, and the sensor electrodes COM(1,4) to COM(8,4) in the fourth column from the left that adopt the third-B mapping, the rightmost terminal $t_{8(n-1)+8}$ of the eight terminals $t_{8(n-1)+1}$ to $t_{8(n-1)+8}$ in each terminal group $T_n$ is connected to the line L1, the second terminal $t_{8(n-1)+7}$ from the right is connected to the line L8, the third terminal $t_{8(n-1)+6}$ from the right is connected to the line L2, the fourth terminal $t_{8(n-1)+5}$ from the right is connected to the line L7, the fifth terminal $t_{8(n-1)+4}$ from the right is connected to the line L3, the sixth terminal $t_{8(n-1)+3}$ from the right is connected to the line L6, the seventh terminal $t_{8(n-1)+2}$ from the right is connected to the line L4, and the eighth terminal from the right (leftmost terminal) $t_{8(n-1)+1}$ is connected to the line L5.

According to the fifth embodiment, even if the sensor electrode COM has an odd shape corresponding to the shape of the round portion or the recess, the lines connected to the detection driver R2 and the sensor electrode COM can be connected since the lines are formed at portions which can make contacts on the sensor electrode.

If the recess 98 is not present, the third-A mapping may be adopted similarly to FIG. 13 or the third-B mapping may be adopted, for the sensor electrodes COM(1,3) to COM(8, 3) relating to the recess 98. Similarly, the third-B mapping may be adapted similarly to FIG. 12 or the third-A mapping may be adopted, in the sensor electrodes COM(1,4) to COM(8,4) relating to the recess 98.

Since the contacts are formed on the left in the sensor electrodes COM(8,3) and COM(7,3) and the contacts are formed on the right in the sensor electrodes COM(8,4) and COM(7,4), the recess can be formed at the central part of the lower side of the display panel PNL.

In the third-A mapping and the third-B mapping, the sensor electrode farthest from the wiring substrate F corresponds to the terminal on the right end or the left end in the terminal group, but the mapping may be modified such that the sensor electrode closest to the wiring substrate F corresponds to the terminal on the right end or the left end in the terminal group. That is, the third-A mapping and the third-B mapping may be modified as follows by changing far positions and close positions of the sensor electrodes.

In modified third-A mapping, the leftmost terminal $t_{8(n-1)+1}$ of the eight terminals $t_{8(n-1)+1}$ to $t_{8(n-1)+8}$ in each terminal group $T_n$ corresponds to the sensor electrode COM(8, n) closest to the wiring substrate F;

the second terminal $t_{8(n-1)+2}$ from the left corresponds to the sensor electrode COM(1, n) farthest from the wiring substrate F;

the third terminal $t_{8(n-1)+3}$ from the left corresponds to the sensor electrode COM(7, n) second closest to the wiring substrate F;

the fourth terminal $t_{8(n-1)+4}$ from the left corresponds to the sensor electrode COM(2, n) second farthest from the wiring substrate F; similarly, the seventh terminal $t_{8(n-1)+7}$ from the left corresponds to the sensor electrode COM(5, n) fourth closest to the wiring substrate F; and the eighth terminal from the left (rightmost terminal) $t_{8(n-1)+8}$ corresponds to the sensor electrode COM(4, n) fourth farthest from the wiring substrate F.

Therefore, in the sensor electrode group adopting modified third-A mapping, the leftmost terminal $t_{8(n-1)+1}$ of the eight terminals $t_{8(n-1)+1}$ to $t_{8(n-1)+8}$ in each terminal group $T_n$ is connected to the line L8, the second terminal $t_{8(n-1)+2}$ from the left is connected to the line L1, the third terminal $t_{8(n-1)+3}$ from the left is connected to the line L7, the fourth terminal $t_{8(n-1)+4}$ from the left is connected to the line L2, similarly, the seventh terminal $t_{8(n-1)+7}$ from the left is connected to the line L5, and the eighth terminal from the left (rightmost terminal) $t_{8(n-1)+8}$ is connected to the line L4.

In modified third-B mapping, the rightmost terminal $t_{8(n-1)+8}$ of the eight terminals $t_{8(n-1)+1}$ to $t_{8(n-1)+8}$ in each terminal group $T_n$ corresponds to the sensor electrode COM(8, n) closest to the wiring substrate F;

the second terminal $t_{8(n-1)+7}$ from the right corresponds to the sensor electrode COM(1, n) farthest from the wiring substrate F;

the third terminal $t_{8(n-1)+6}$ from the right corresponds to the sensor electrode COM(7, n) second closest to the wiring substrate F;

the fourth terminal $t_{8(n-1)+5}$ from the right corresponds to the sensor electrode COM(2, n) second farthest from the wiring substrate F; similarly, the seventh terminal $t_{8(n-1)+2}$ from the right corresponds to the sensor electrode COM(5, n) fourth closest to the wiring substrate F; and the eighth terminal from the right (leftmost terminal) $t_{8(n-1)+1}$ corresponds to the sensor electrode COM(4, n) fourth farthest from the wiring substrate F.

Therefore, in the sensor electrodes COM adopting the modified third-B mapping, the rightmost terminal $t_{8(n-1)+8}$ of the eight terminals $t_{8(n-1)+1}$ to $t_{8(n-1)+8}$ in each terminal group $T_n$ is connected to the line L8, the second terminal $t_{8(n-1)+7}$ from the right is connected to the line L1, the third terminal $t_{8(n-1)+6}$ from the right is connected to the line L7, the fourth terminal $t_{8(n-1)+5}$ from the right is connected to the line L2, and then, similarly, the seventh terminal $t_{8(n-1)+2}$ from the right is connected to the line L5, and the eight terminal from the right (leftmost terminal) $t_{8(n-1)+1}$ is connected to the line L4.

Line Connection Common to Embodiments

Figure 14A:
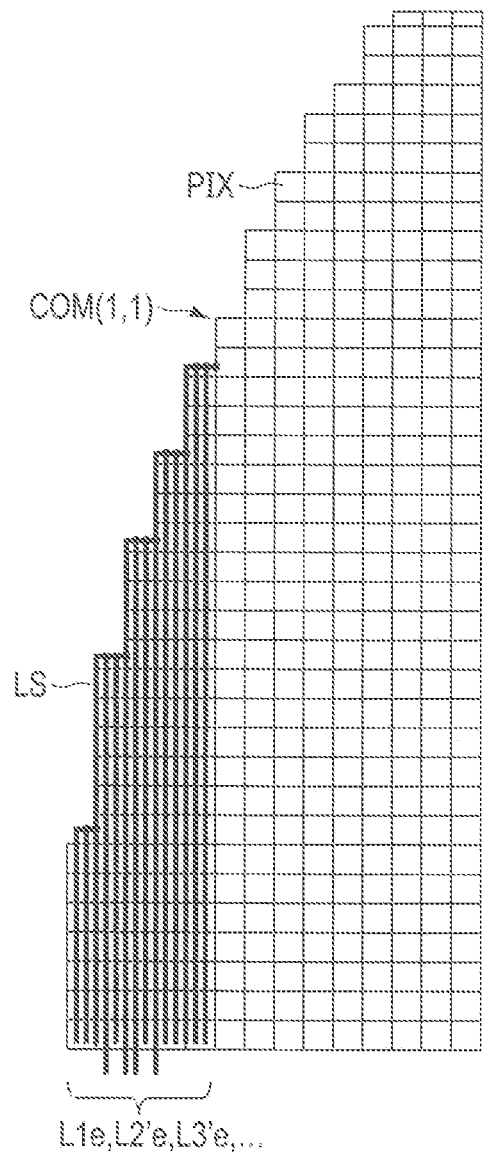
FIG. 14A is a view showing an example of line connection in a peripheral region in the first, third, and fourth embodiments.
Figure 14B:
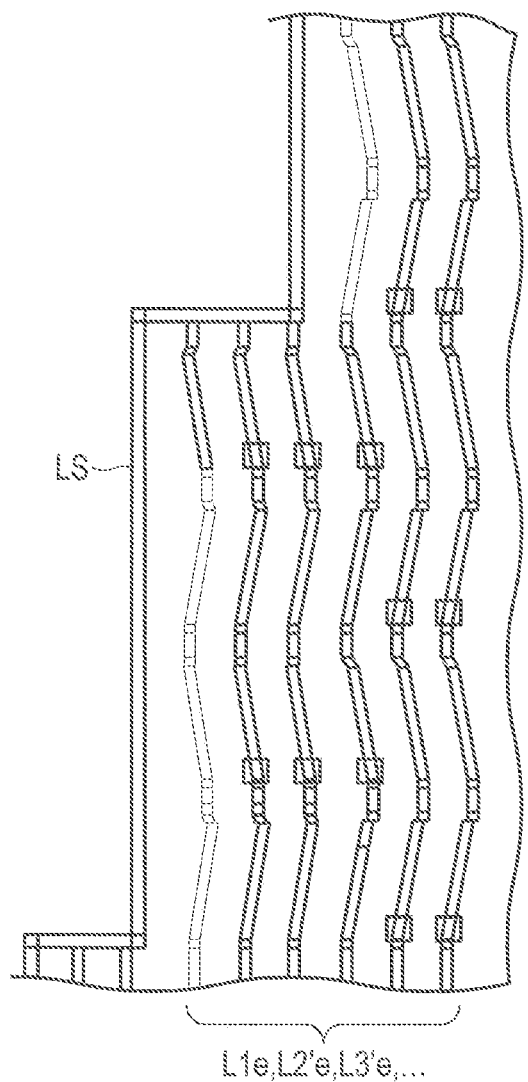
FIG. 14B is a view showing another example of line connection in a peripheral region in the first, third, and fourth embodiments.

FIGS. 14A and 14B show an example of connection of the leads in the peripheral region SA in the first, third, and fourth embodiments. In the first, third, and fourth embodiments, the sensor electrode COM(1,1) is rounded at its upper left corner. Though FIG. 6, FIG. 9, and FIG. 12 show the case where the round corners are arcuate, actually, the round portion of the sensor electrode COM(1,1) has a zigzag step shape according to the pixels as shown in FIG. 14A since the outline of the round portion of the sensor electrode COM (1,1) is defined in units of pixel PIX. FIG. 14A is an enlarged view showing a sensor electrode COM(1,1) of FIG. 6, and FIG. 14B is an enlarged view of FIG. 14A.

For convenience of explanations, six contacts are shown in FIG. 6 but a number of contacts are formed for one sensor electrode as shown in FIG. 14A and FIG. 14B. An ability to drive the sensor electrode by the detection driver R2 is inversely proportional to a distance to the sensor electrode. Since the driving ability of the sensor electrode becomes weak as the sensor electrode is farther from the detection driver R2, the number of contacts may be increased in the sensor electrode farther from the detection driver R2. Therefore, as shown in FIG. 14A, the number of the leads L1e, L2'e, and L3'e connected to the contacts and drawn to the peripheral area SA is reduced (to, for example, two) in the sensor electrodes of the pixels close to the detection driver R2 i.e., on the left in FIG. 14A, and the number of the leads L1e, L2'e, and L3'e is increased (to, for example, four) in the sensor electrodes of the pixels far from the detection driver R2 i.e., on the right in FIG. 14A.

Figure 15:
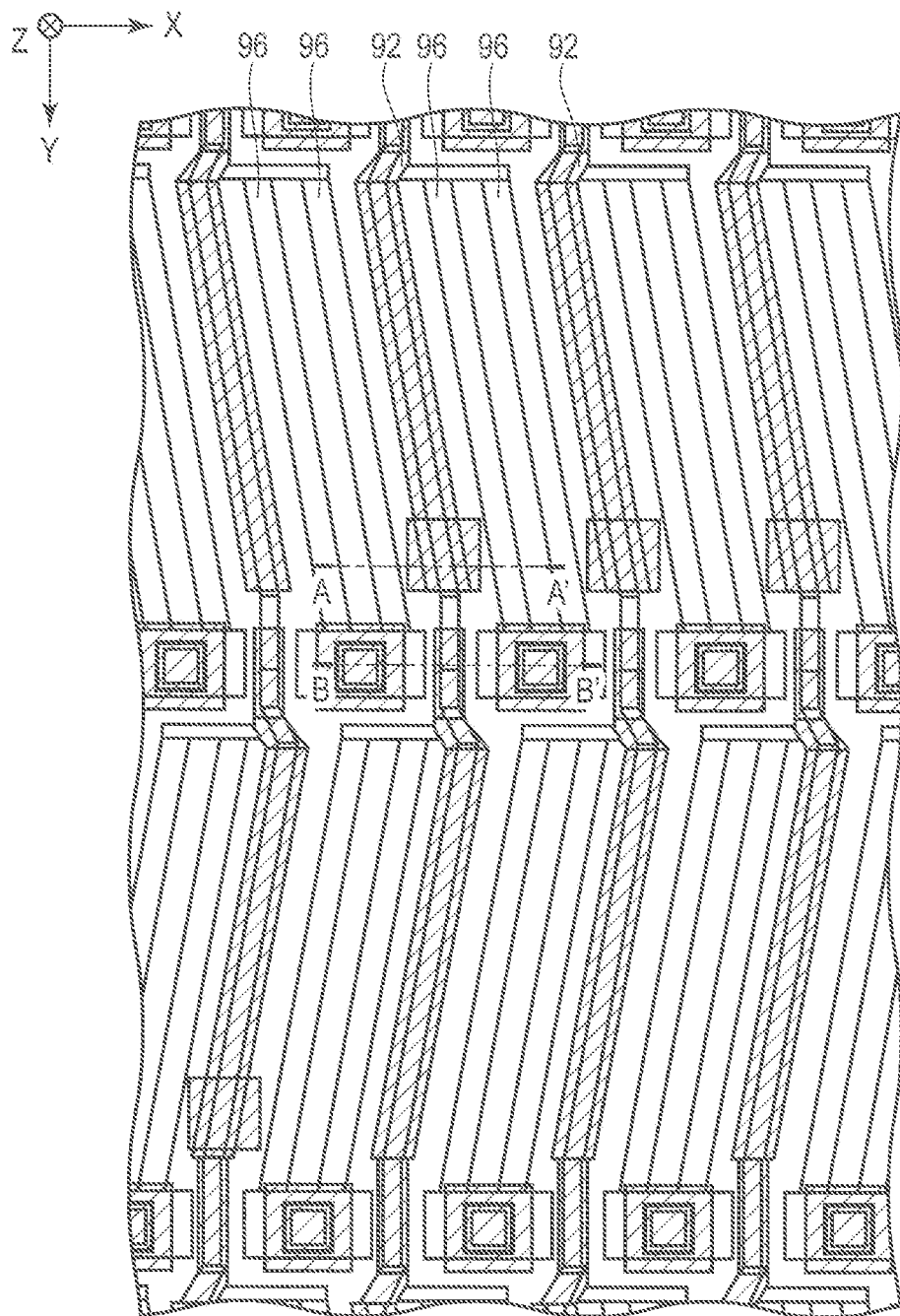
FIG. 15 is an enlarged view of FIG. 14B.

FIG. 15 is a plan view showing a pixel region, FIG. 16A is a cross-sectional view showing the first substrate SUB1 along line A-A' of FIG. 15, and FIG. 16B is a cross-sectional view showing the first substrate SUB1 along line B-B' of FIG. 15.

As shown in FIGS. 16A and 16B, an insulating layer 81 of an inorganic film is formed on a base 80. A semiconductor layer formed of a polysilicon layer is formed between the base 80 and the insulating layer 81, at a portion other than FIGS. 16A and 16B. An insulating layer 82 of an inorganic film is formed on the insulating layer 81. A scanning line layer (also called a gate line layer) of, for example, a molybdenum tungsten alloy (MoW) is formed between the insulating layer 81 and the insulating layer 82, at portions other than FIGS. 16A and 16B. A first HRC layer 86 of an inorganic film is formed on the insulating layer 82. A signal line layer (also called a source line layer) 84 of, for example, titanium nitride/titanium/aluminum/titanium (TiN/Ti/AL/ Ti) are formed between the insulating layer 82 and the first HRC layer 86. A line 88 of a third metal layer is formed at a portion on the first HRC layer 86 corresponding to the signal line 84. A third metal layer is formed of, for example, titanium nitride/titanium/aluminum/titanium (TiN/Ti/AL/ Ti). The line 88 forms the lines L1 to L8 and the lead portions L1e, L2'e, and L3'e. A first ITO layer 92 is formed on the line 88 via a second insulating layer 90 formed of an organic film. The first ITO layer 92 forms the sensor electrode COM. As shown in FIG. 16A, the first ITO layer 92 (sensor electrode COM) is connected to parts of the line 88 (lines L1 to L8 and lead portions L1e, L2'e, and L3'e). The first and second HRC layers 86 and 90 may be inorganic films.

A second ITO layer 96 is formed on the first ITO layer 92 via an interlayer insulating layer 94. The second ITO layer 96 forms the pixel electrodes 64 (FIG. 2). As shown in FIG. 16B, the second ITO layer 96 (pixel electrode 64) is electrically connected to the first ITO layer 92 (sensor electrode COM), the line 88 (lines L1 to L8 and leads L1e, L2'e, and L3'e), and the signal line 84.

Modified Examples Common to all Embodiments

The sensor electrodes COM are provided in the display area DA but peripheral electrodes for detection may also be provided in the peripheral area SA. In this case, a distance between an object in contact with the peripheral area SA and the peripheral electrodes is shorter than a distance between the object and the sensor electrodes provided in the display area DA. Thus, the variation in the electrostatic capacitance of the peripheral electrodes caused by the object in contact with the peripheral area SA becomes large and the sensitivity of detection in the peripheral area SA is improved.

The terminals of the detection driver R2 are directly connected to the sensor electrodes COM such that the terminals of the detection driver R2 correspond to the sensor electrodes COM in one-to-one relationship, but a connection circuit such as a multiplexer may be connected between the detection driver R2 and the sensor electrodes COM. The connection circuit connects a terminal of the detection driver R2 to one of the sensor electrode COM groups in time division. The number of terminals of the detection driver R2 can be thereby reduced.

The formation area of the lines L1 to L8 in the sensor electrodes COM extends up to the contacts to the sensor electrodes COM, and the lines L1 to L8 are different in length, but all of the lines L1 to L8 may be formed to extend up to the sensor electrodes COM(1,1) to COM(1,6) farthest from the wiring substrate F. Since the lines L1 to L8 are provided uniformly on the whole surface of the display area DA, the light transmittance cannot be irregular and excellent visibility can be implemented.

The recess 98 is provided on the upper side of the display area DA, but may be provided on the lower side or each of the upper side and the lower side. Furthermore, the recess 98 may be provided on not only each of the upper and lower sides, but at least one of the right and left. The recess 98 may be provided at any part and the position of the recess is not limited.

Furthermore, the display panel having an odd shape is not limited to the display panel having at least two round corners and the recess. The display panel having an odd shape may be a display panel having at least two round corners or a display panel having the recess.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A display device comprising:
a base substrate;
pixel electrodes arranged in a display area;
sensor electrodes arranged in a matrix in the display area;
a first insulating layer between the pixel electrodes and the sensor electrodes;
metal lines connected to one of the sensor electrodes;
a second insulating layer between the metal lines and the one of the sensor electrodes; and
connection terminals arranged in a first direction and located at a terminal area outside of the display area; wherein
the base substrate includes a round corner, which is a part of an outer edge of the base substrate,
the sensor electrodes include a first sensor electrode,
the first sensor electrode is located near the round corner,
the metal lines include a first metal line and a second metal line,
the second metal line extends in parallel to the first metal line,
the second metal line is arranged at intervals with the first metal line in the first direction,
the first metal line and the second metal overlap with the first sensor electrode,
the first metal line is connected to the second metal line via a coupling line,
the coupling line is located at a peripheral area on an opposite side of the terminal area, and
the peripheral area is an area outside of the display area.

2. The display device of claim 1, wherein
the second insulating film includes a first surface and a second surface opposed to the first surface,
the first sensor electrode is in contact with the first surface, and
the first metal line, the second metal line, and coupling line are in contact with the second surface.

3. The display device of claim 2, wherein the one of the sensor electrodes is the first sensor electrode.

4. The display device of claim 3, wherein
the first sensor electrode includes an outer edge along the round corner of the base substrate,
the first metal line traverses the outer edge of the first sensor electrode,
the second metal line traverses the outer edge of the first sensor electrode, and
the coupling line is located between the outer edge of the first sensor electrode and the round corner of the base substrate.

5. The display device of claim 3, wherein
the second insulating film includes first contact holes and second contact holes,
the first metal line is connected to the first sensor electrode via the first contact holes,
the second metal line is connected to the first sensor electrode via the second contact holes, and
a number of the first contact holes is different from a number of the second contact holes.

6. The display device of claim 2, wherein
the first sensor electrode includes an outer edge along the round corner of the base substrate,
the first metal line traverses the outer edge of the first sensor electrode,
the second metal line traverses the outer edge of the first sensor electrode, and
the coupling line is located between the outer edge of the first sensor electrode and the round corner of the base substrate.

7. The display device of claim 2, wherein
the sensor electrodes further include a second sensor electrode,
the second sensor electrode is located between the first sensor electrode and the terminal area,
the first metal line overlaps the second sensor electrode,
the second metal line does not overlap the second sensor electrode.

8. The display device of claim 7, wherein
the first sensor electrode has a first shape,
the second sensor electrode has a second shape, and
the first shape is different shape of the second shape.

9. The display device of claim 2, wherein the display area is located between the peripheral area on the opposite side of the terminal area and the terminal area.

* * * * *